US011242211B2

(12) United States Patent
Bennett et al.

(10) Patent No.: US 11,242,211 B2
(45) Date of Patent: Feb. 8, 2022

(54) BIN PACKING SYSTEM AND METHOD

(71) Applicant: Volm Companies, Inc., Antigo, WI (US)

(72) Inventors: Benjamin Bennett, Burlington (CA); Paolo Giammarco, Hamilton (CA)

(73) Assignee: Volm Companies, Inc., Antigo, WI (US)

( * ) Notice: Subject to any disclaimer, the term of this patent is extended or adjusted under 35 U.S.C. 154(b) by 100 days.

(21) Appl. No.: 16/653,364

(22) Filed: Oct. 15, 2019

(65) Prior Publication Data
US 2020/0122936 A1    Apr. 23, 2020

Related U.S. Application Data

(60) Provisional application No. 62/747,989, filed on Oct. 19, 2018.

(51) Int. Cl.
*B65G 47/90* (2006.01)
*B65G 65/32* (2006.01)

(52) U.S. Cl.
CPC .......... *B65G 47/905* (2013.01); *B65G 65/32* (2013.01); *B65G 2201/0235* (2013.01)

(58) Field of Classification Search
CPC ...... B65G 47/905; B65G 57/112; B65G 57/11
USPC ........................................ 53/540; 414/790.4
See application file for complete search history.

(56) References Cited

U.S. PATENT DOCUMENTS

| | | | |
|---|---|---|---|
| 3,885,682 A * | 5/1975 | McWilliams | .......... B65G 67/08 414/789.8 |
| 3,941,236 A | 3/1976 | Hagedorn | |
| 4,611,458 A | 9/1986 | Prakken | |
| 4,976,584 A | 12/1990 | Focke | |
| 5,066,189 A * | 11/1991 | Shell | .......... B66C 1/28 414/416.09 |
| 5,069,598 A * | 12/1991 | Kleinhen | .......... B62B 3/008 414/790 |
| 5,123,231 A * | 6/1992 | Fallas | .......... B65B 5/101 53/260 |
| 5,348,440 A | 9/1994 | Focke | |
| 5,372,472 A * | 12/1994 | Winski | .......... B65G 47/086 414/789.6 |

(Continued)

FOREIGN PATENT DOCUMENTS

| | | |
|---|---|---|
| FR | 3 062 331 | 8/2018 |
| JP | 2016210616 | 3/2016 |

OTHER PUBLICATIONS

Description of Robotic Case Packing System Sold Prior to Oct. 19, 2017; 10 pages.

*Primary Examiner* — Lynn E Schwenning
(74) *Attorney, Agent, or Firm* — Boyle Fredrickson S.C.

(57) ABSTRACT

A single robot of a two-lane bin packing system has an end of arm tool (EOAT) that interfaces with two infeed lines and two bins on an ongoing basis so that the robot can pick a group of bags from a first bag group staging area on the first infeed line while a group of bags is being formed in a second bag group staging area by the second infeed line. In addition, by interfacing with two separate bins, one bin can be filled while another, full bin is being replaced with an empty bin. The EOAT thus operates constantly. The bag groups can be formed in layers by discharging bags on a reciprocating shuttle of a pick table assembly.

31 Claims, 29 Drawing Sheets

(56) References Cited

U.S. PATENT DOCUMENTS

| | | | | |
|---|---|---|---|---|
| 5,540,545 A * | 7/1996 | Roberts | B65G 57/245 |
| | | | 414/792.6 |
| 6,843,360 B2 * | 1/2005 | Peterman | B65B 35/405 |
| | | | 198/418.6 |
| 7,017,321 B2 * | 3/2006 | Salvoni | B65B 7/164 |
| | | | 198/460.1 |
| 7,114,609 B2 * | 10/2006 | Christman | B65B 25/146 |
| | | | 198/442 |
| 7,788,886 B2 * | 9/2010 | Aquarius | B65G 47/2445 |
| | | | 53/502 |
| 7,856,797 B2 * | 12/2010 | Black | B65B 35/52 |
| | | | 53/447 |
| 8,997,438 B1 * | 4/2015 | Fallas | B25J 9/107 |
| | | | 53/251 |
| 2016/0318720 A1 * | 11/2016 | Roos | B65G 57/11 |
| 2018/0237235 A1 * | 8/2018 | Justesen | B25J 15/0014 |
| 2021/0284370 A1 * | 9/2021 | Prakken | B65B 39/007 |

* cited by examiner

BIN PACKING SYSTEM AND METHOD

CROSS REFERENCE TO A RELATED APPLICATION

This non-provisional application claims benefit under 35 U.S.C. section 119(e) to U.S. Provisional Patent Application Ser. No. 62/747,989; Filed Oct. 19, 2018 and entitled *Bin Filling System and Method*, the subject matter of which is hereby incorporated by reference in its entirety.

BACKGROUND OF THE INVENTION

1. Field of the Invention

The invention relates to packing systems and methods and, more particularly, relates to a robotic-based system and process for packing bins with filled bags.

2. Discussion of the Related Art

Bags filled with items are routinely packed in bins for shipment. The bin is considered "filled" when packed with a desired quantity of bags which may or may not approach or equal the holding capacity of the bin. "Bags" as used herein means flexible containers storing individual or groups of bundled or packaged items. The bags may be formed of paper, a mesh material, a plastic film material, or a combination thereof. Bags may also include cartons or other packages. Any package or container capable of being stacked in a group and handled as a group by a robotic EOAT can be considered a "bag" within the context of the present invention. Bags handled by systems most relevant to this disclosure may have a capacity of 1 lb. or less to 30 lbs. or more and, more typically, of 3 lbs. to 20 lbs. The items contained in the bags may be produce items, such as potatoes, carrots, onions, etc., or any other discrete items capable of being inserted into and transported in bags.

A "bin", as that term is used herein, means any open-topped container capable of holding and transporting multiple bags of items. "Open-topped" means that the top of the container is open when the container is being filled. The container may have flaps or a lid that close(s) the top of the container for storage or transport. The bin may be made of plastic, wood, cardboard, etc. Its shape, when viewed in top plan, may be rectangular, square, hexagonal, octagonal, etc. The typical bin may have a mass capacity of 1000 to 2000 lbs. (450-900 kg), an area of 1.0 to 1.25 $m^2$ and an internal volume of 0.5 to 1.6 $m^3$. Much larger and smaller bins also are considered to fall within the scope of this disclosure.

Bins historically were packed manually, possibly with the aid of a conveyor that delivers bags to a staging area located adjacent to the bin. Manual bin packing is a labor and time consuming process. Automatic filling of a bin while using its entire footprint can be hindered by the shape of the bin itself. For example, filling a hexagonal bin typically requires orientating some of the bags 90 degrees offset from other bags. Automated filling is further hindered by the fact that it is often desirable to stack succeeding layers of bags in different patterns to form a more stable, uniform stack in the bin.

More recently, robotic bin packing systems have been devised. The typical robot has an end of arm tool (EOAT) that retrieves one or, in some cases, a group of bags from a staging area and deposits the bag(s) in the bin. One such system, developed by the Applicant, includes an accumulator conveyor which conveyed a stack of designated number of (typically 2-5) bags to a pick conveyor. An EOAT of the robot is operable to pick the stack of bags from the pick conveyor and to deposit the stack in a bin located in a bin staging area. The EOAT overall length allows 90-degree rotation of the EOAT relative to the bin to accommodate a desired filling pattern, allowing utilization of the whole footprint of the bin. Bags also can be stacked in different patterns in different layers to obtain a more stable, uniform stack. After a bin is filled, it conveyed out of the staging area, replaced with an empty bin, and filled.

While the system described above permits rapid packing of a bin in a manner that allows utilization of the entire footprint of the bin, it leaves room for improvement.

For example, the system has only a single infeed conveyor assembly and can fill only a single bin at a time. Considerable down-time is expended during bin-changeover operations.

In addition, the pick-conveyor is capable of staging only a few bags at a time, further limiting bin packing rates.

The need therefore has arisen to improve the rate at which a bin can be packed with filled bags.

The need therefore has arisen to provide a robotic bin-packing system that is versatile both in the number and size of bags it can handle and in the size and configuration of bins that can be packed.

SUMMARY

In accordance with a first aspect of the invention, a robotic-based bin packing system is configured to receive bags, accumulate a designated number of bags for subsequent handling, stacking the bags to form a group of bags, and using a robotic end of arm tool, transporting the group of bags to a designated location in a bin located in a bin staging area. The system is further configured to place the group of bags in the bin, and to move bins into and out of the bin staging area while packing a bin in another bin staging area.

The equipment used to form a group of bags may be positionally variable in mutually orthogonal X, Y, and Z directions to permit bags to be rapidly stacked in rows to form the group.

In one configuration, a single robot interfaces with two bag group staging areas and two bins in two bin staging areas on an ongoing basis so that the robot can pick a group of bags from the first bag group staging area while a group of bags is being formed in the second bag group staging area. In addition, by interfacing with two separate bins, one bin can be filled while another, full bin is being replaced with an empty bin.

When handling bags, the system can handle bags ranging in capacity from 1 to 30 lbs. or larger. It is capable of filling bins at a rate of over 30, and even forty or more 20 lbs. bags per minute and, and at rates of more 40 bags per minute, and up to 50 bags per minute or more. It can handle more than 50, more than 70 and up to 100 or more 5 lb. bags/minute. Groups of bags can be loaded into the bins in stacks of 2 to 14 bags or more, and more typically 5-10 bags. Each group can contain 2-14 bags or more (depending on their size) stacked in two or more layers. The pattern in which the bags are stacked to form the group can be set to maximize stability and minimize wasted space. This pattern can even be varied as a bin is being packed to fill a bin with a desired number of bags. Groups of 6 or more stacked bags can be picked and placed into bins at a rate exceeding five groups per minute, more than seven groups per minute, and up to ten or more groups per minute.

Also disclosed is a system for staging a group of bags prior to packing the bags in a bin. The system includes a conveyor having an inlet end and a discharge end, and a pick table assembly. The pick table assembly comprises a frame and a shuttle that is located under the discharge end of the conveyor and that is moveable laterally relative to the conveyor so that successive bags discharged from the conveyor and deposited on the shuttle are spaced laterally of one another. The shuttle may include a base forming a bag support surface, a backplate extending upwardly from a rear of the base, and end plates extending upwardly from opposed ends of the base.

Also disclosed is a method of filling bins using a robotic EOAT. The method includes forming a first group of bags by stacking bags in a first bag group staging area of first and second spaced bag group staging areas and then, using a robotic end of arm tool (EOAT), packing the first group of bags in a bin by picking the first group of bags from the first bag group staging area and placing the first group of bags in the first bin. The method additionally includes, during forming of the first group of bags, using the EOAT, packing a second group of bags in the bin by picking a second group of bags from the second bag group staging area and placing the second group of bags in the first bin. The method still additionally includes, during the packing of the first group of bags in the bin, forming a third group of bags by stacking bags in the second bag group staging area. These actions are repeated until the first bin is fully packed.

The method may additionally include, while the first bin is being packed, conveying a second, full bin out of a second bin staging area and replacing the second bin with a third, empty bin. That third bin then can be packed while the filled first bin is being replaced with an empty bin.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
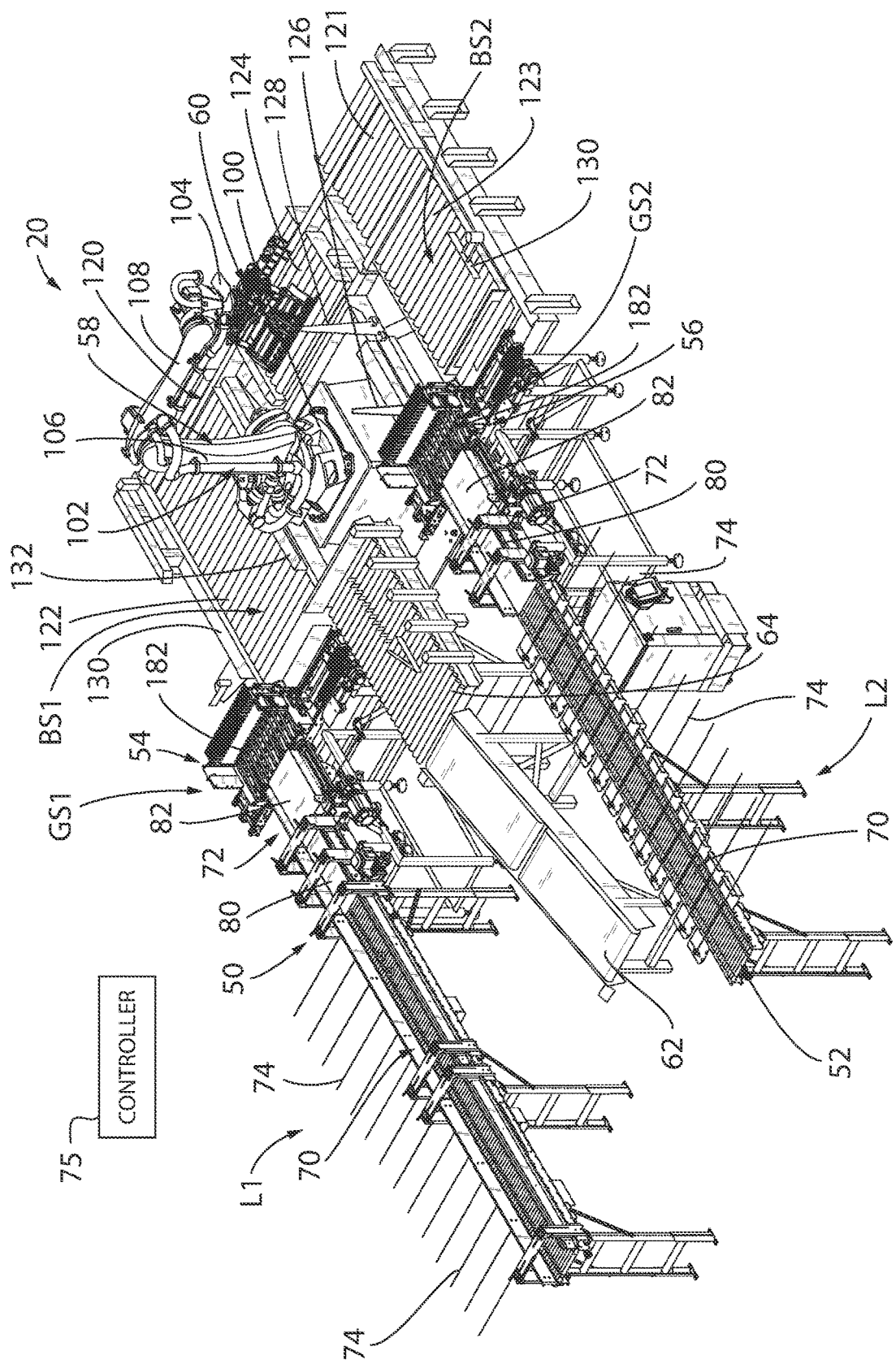
FIG. 1 is an isometric view of a bin filling system constructed in accordance with an embodiment of the present invention.
Figure 2:
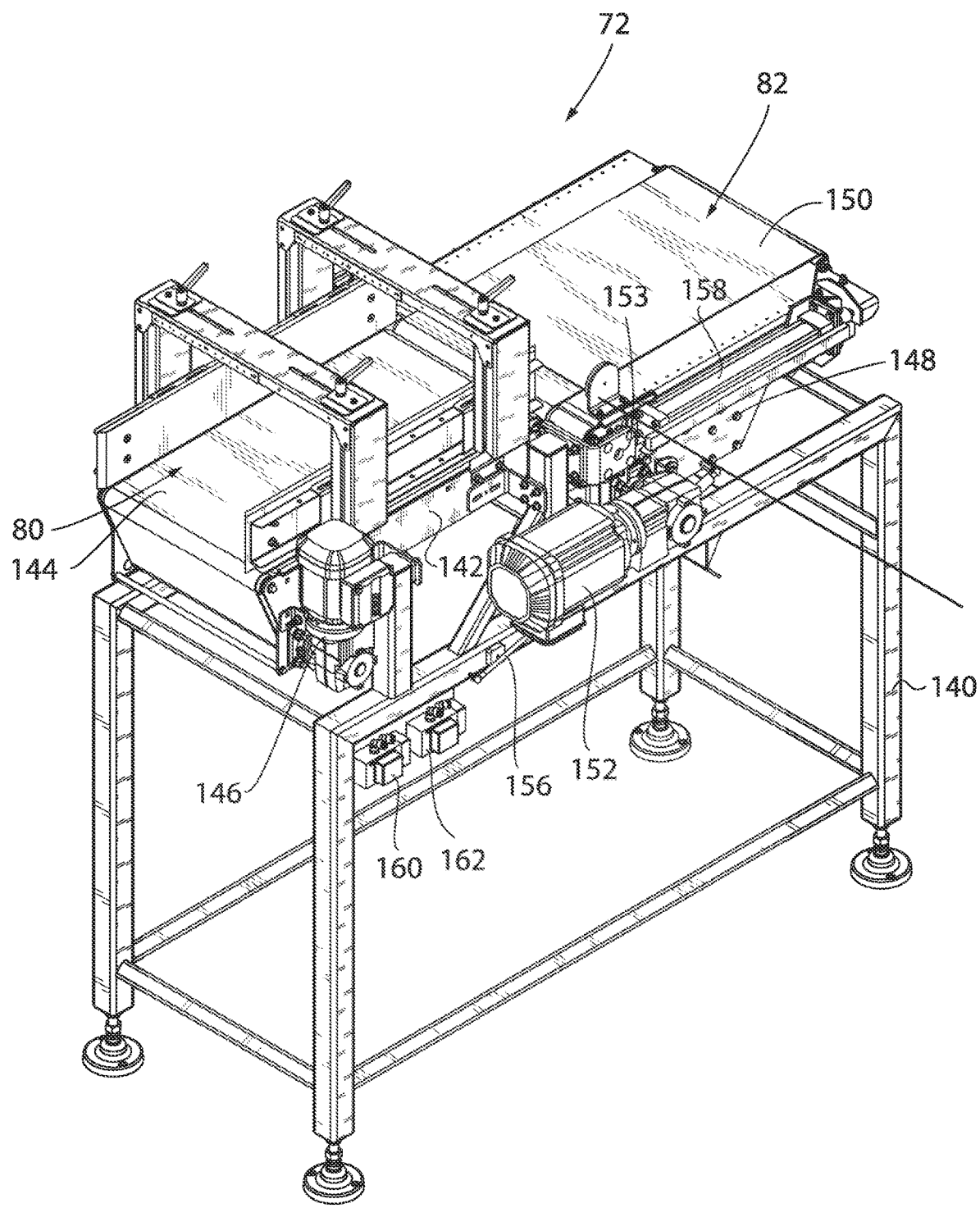
FIG. 2 is an isometric view of an infeed conveyor assembly of the system of FIG. 1.
Figure 3:
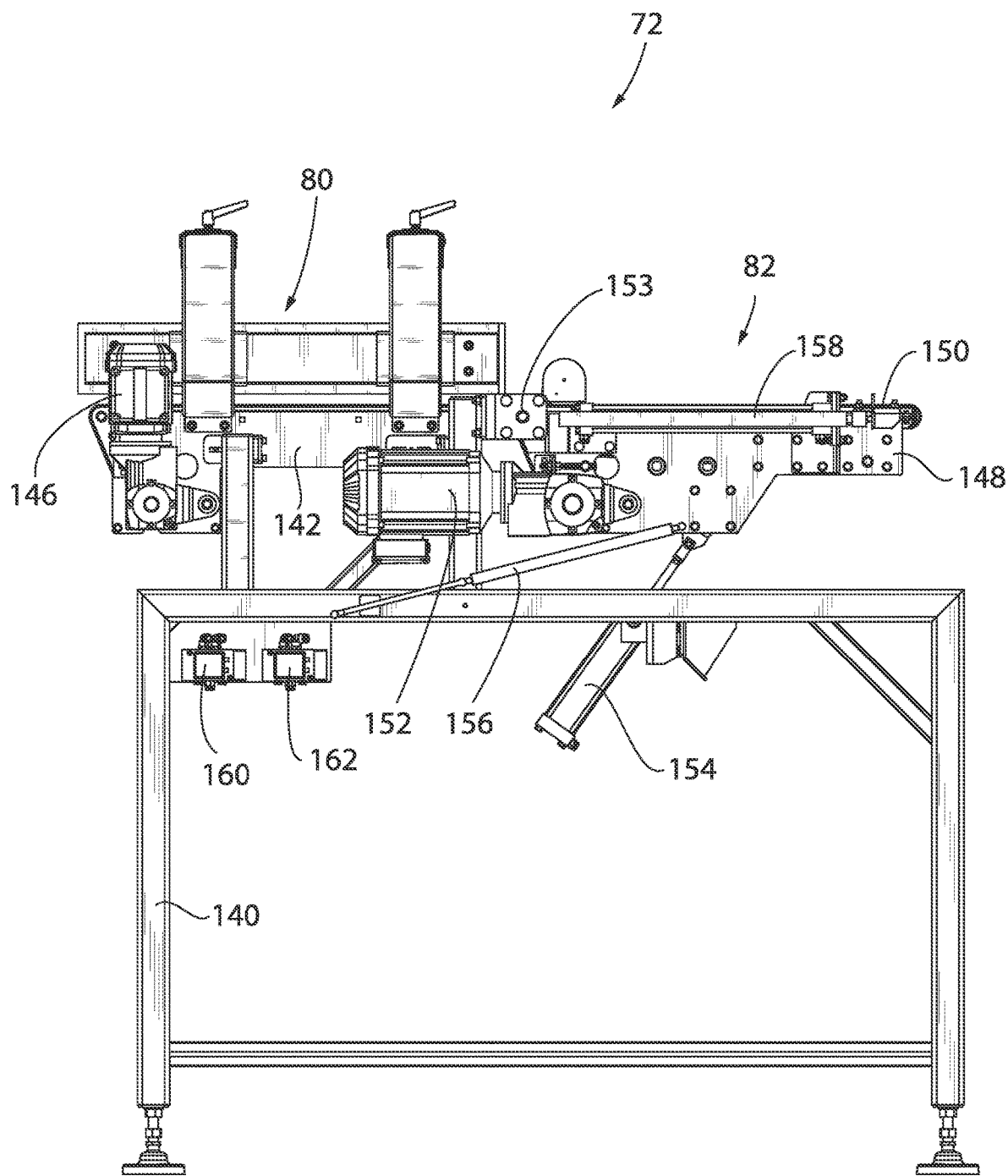
FIG. 3 is a right side elevation view of the infeed conveyor assembly of FIG. 2.
Figure 4:
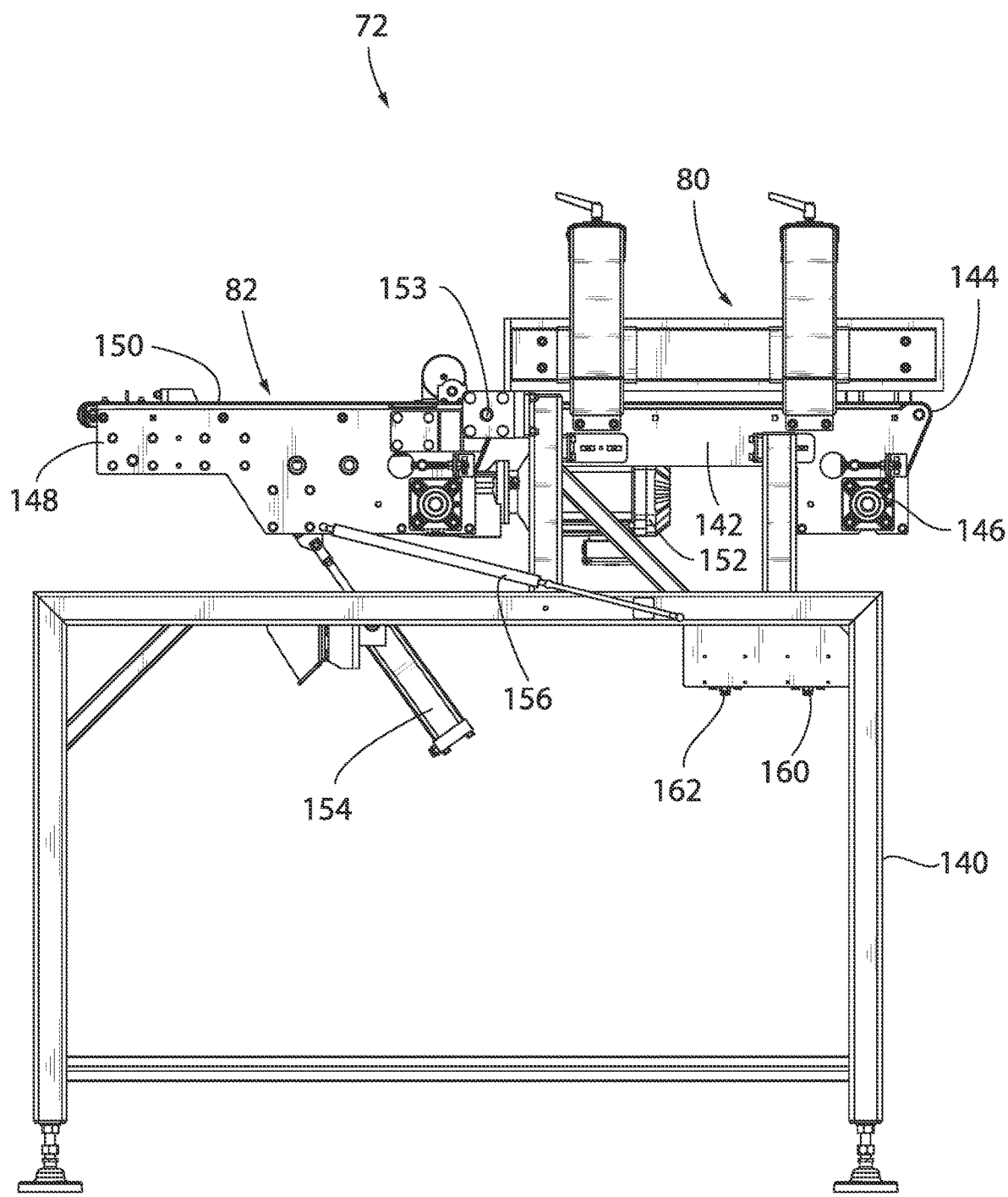
FIG. 4 is a left side elevation view of the infeed conveyor assembly of FIGS. 2 and 3.
Figure 5:
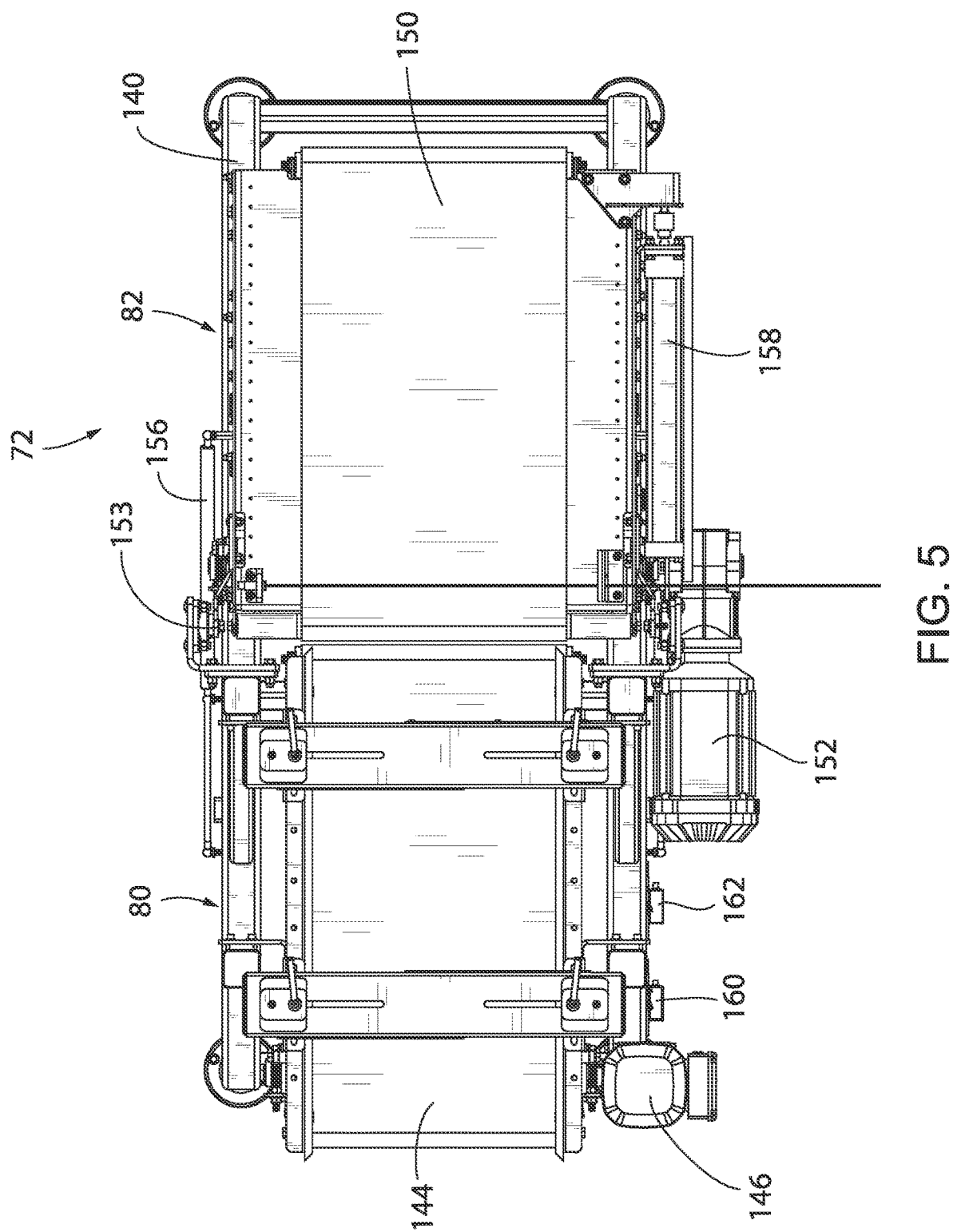
FIG. 5 is a top plan view of the infeed conveyor assembly of FIGS. 2-4, showing the accelerator conveyor thereof in a retracted position.
Figure 6:
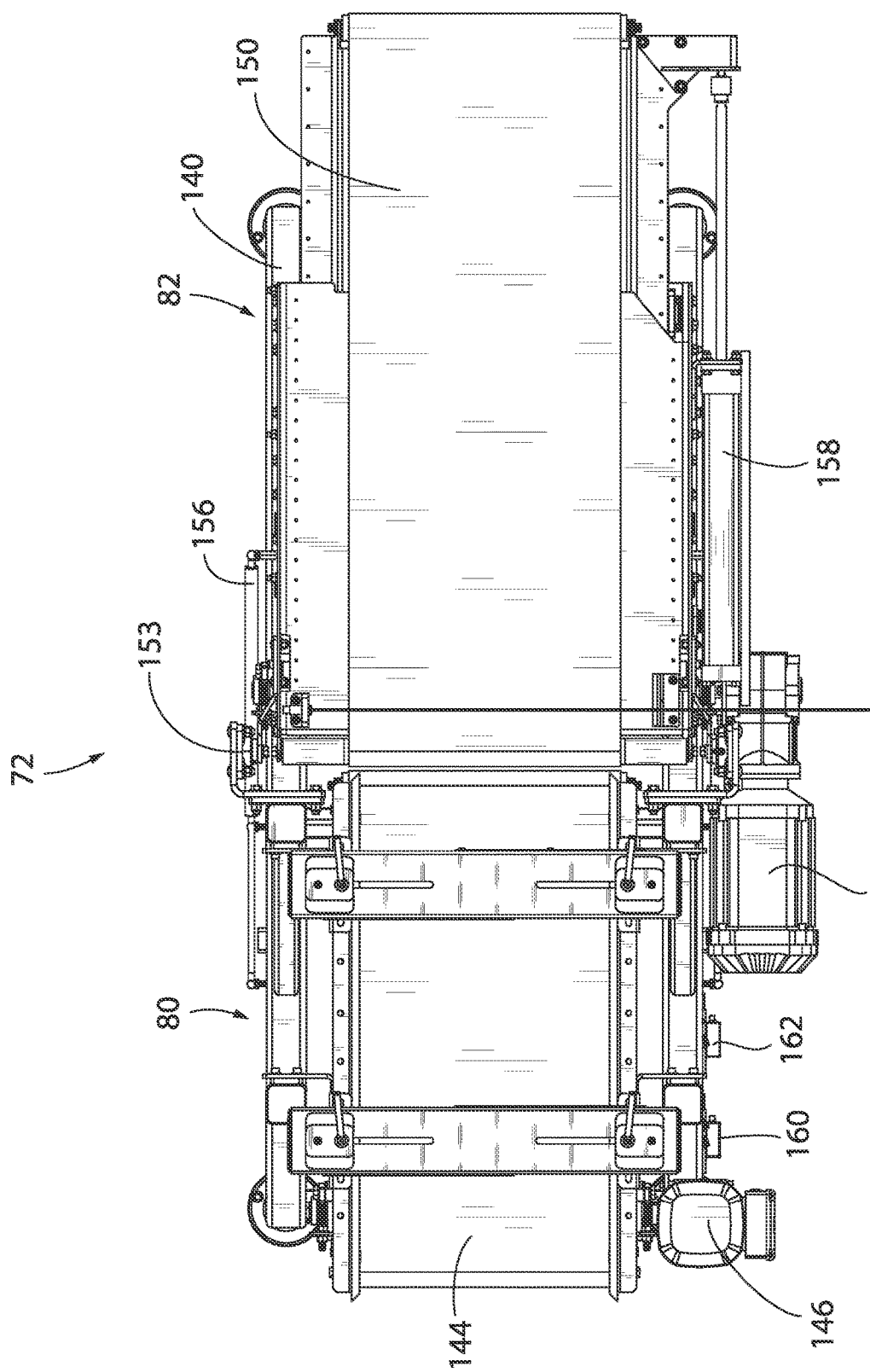
FIG. 6 is a top plan view of the infeed conveyor assembly of FIGS. 2-5, showing the accelerator conveyor thereof in an extended position.
Figure 7:
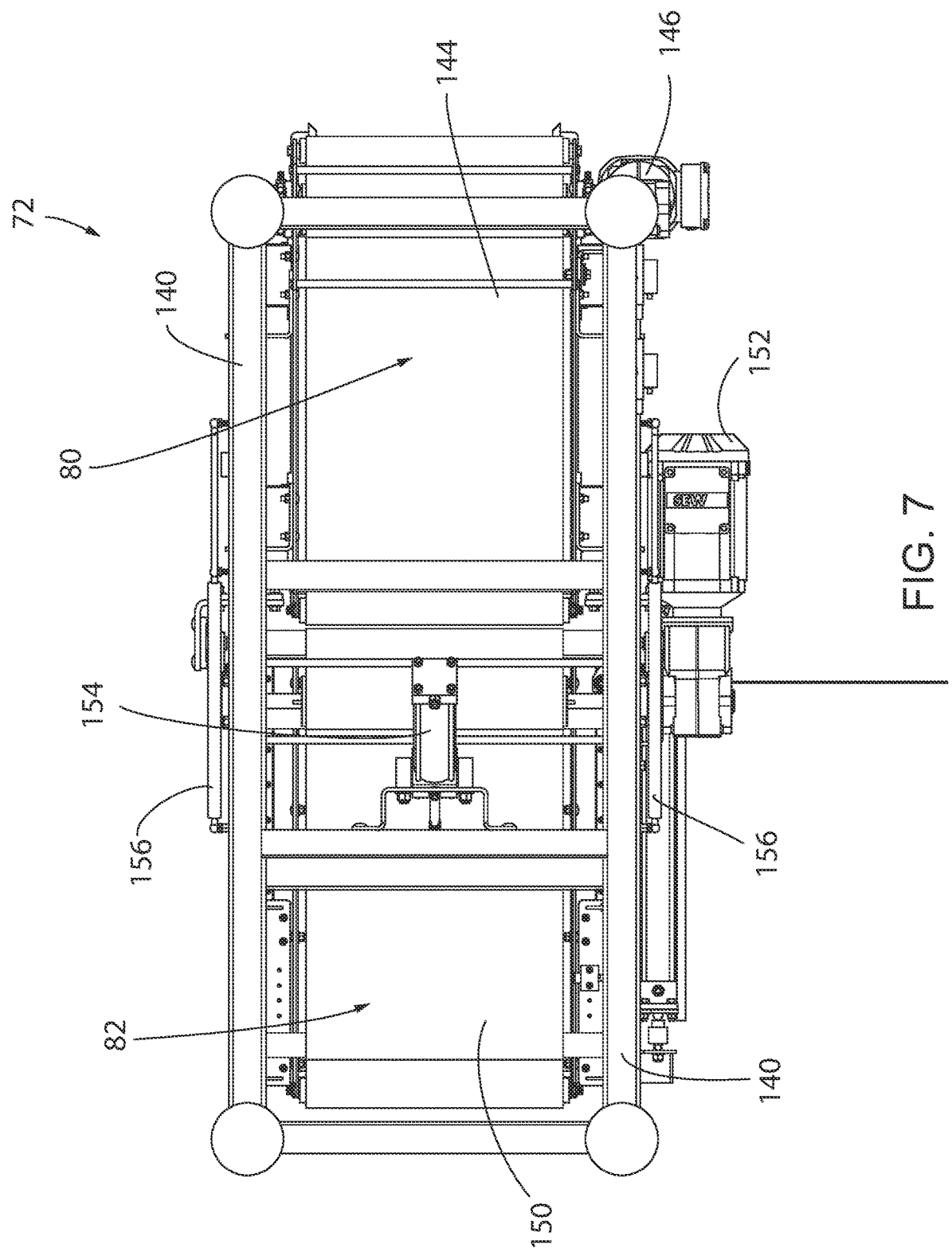
FIG. 7 is a bottom plan view of the infeed conveyor assembly of FIGS. 2-6, showing the accelerator conveyor thereof in a retracted position.
Figure 8:
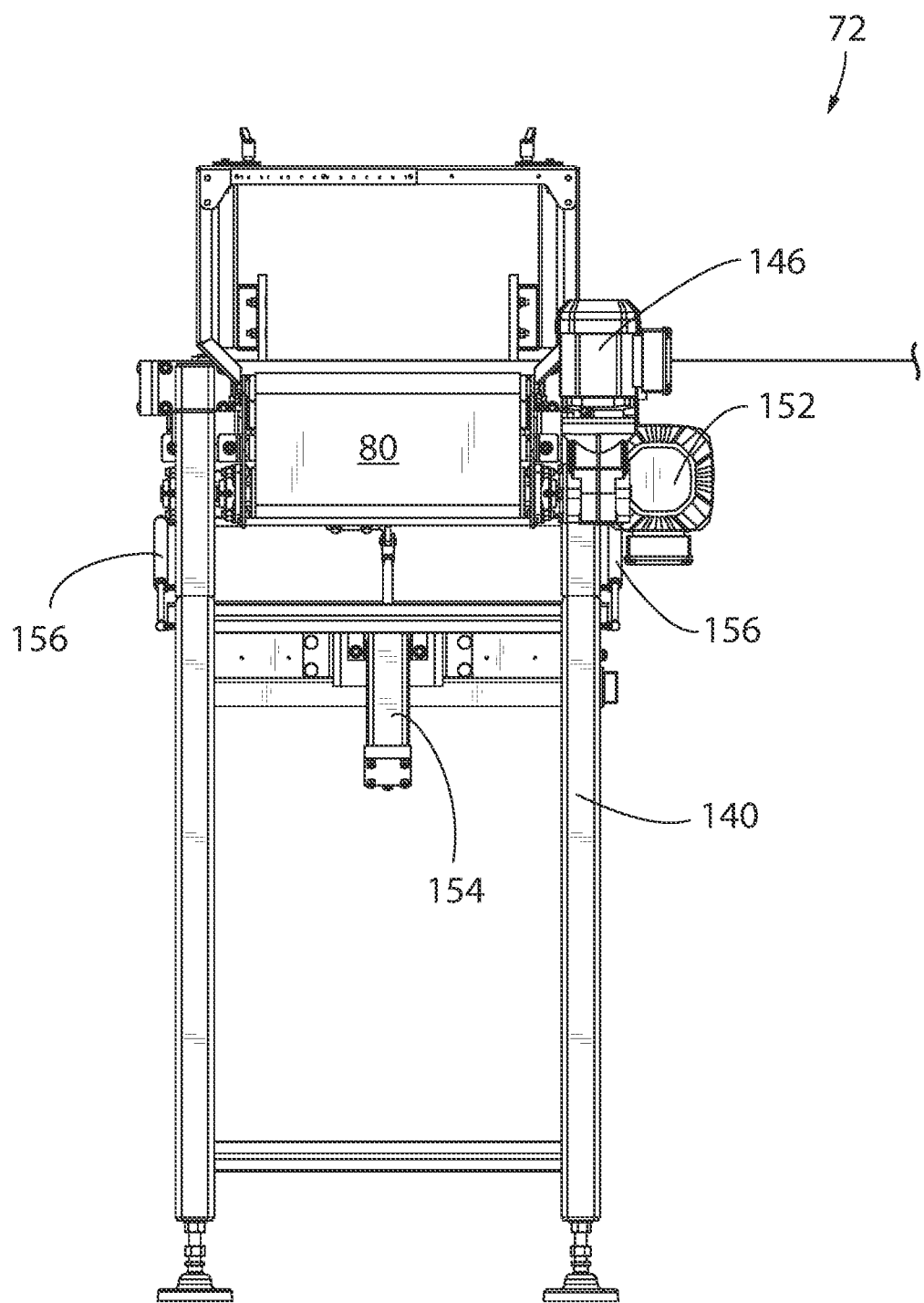
FIG. 8 is a front end elevation view of the infeed conveyor assembly of FIGS. 2-7.

FIG. 1 depicts a bin filling or packing system 20 for packing "bins" with "bags" as those terms are defined above. The bin packing system 20 includes first and second (left and right) lanes L1 and L2, each of which delivers bag to a respective bag group staging area GS1 and GS2. Each lane L1, L2 has an infeed assembly or supply conveyor assembly 50 or 52 and a pick table assembly 54 or 56 located in the bag group staging area GS1 or GS2. System 20 additionally includes a robot 58 for picking groups of bags from the bag group staging areas GS1 and GS2 and placing them in bins in first and second bin staging areas BS1 and BS2. The illustrated bin staging areas BS1 and BS2 are shown as being located in-line with the bag group staging areas GS1 and GS2 and with the associated lanes L1 and L2, but that need not be the case. In addition, a bin conveyor system 60 is provided to transport bins to and from the bin stating areas BS1 and BS2. Also contained in this particular system, though in no way necessary to it, is a palletizing assembly including an infeed conveyor 62 and a pallet conveyor 64.

Still referring to FIG. 1, each supply conveyor assembly 50 or 52 includes an accumulator conveyor 70 and an infeed conveyor assembly 72. The accumulator conveyor 70 is a line shaft conveyor with rollers grouped in a number of individually-driven zones, that number being 14 in this embodiment. Each zone is controlled by an electric eye generating a beam 74. The electric eyes are controlled by the system's controller 75 to brake the associated rollers of the conveyor 70 when a bag is present in the controlled zone. The rollers thus are driven to accumulate a number of bags, arranged end-to-end, that equals the number to be picked or placed in a particular group. In an optimal situation, as soon as the robot takes the bags away from one of the pick table assemblies 54 or 56 in its respective staging area GS1 or GS2, there will be enough bags accumulated on the associated accumulator conveyor 70 to start preparing the next pick right away.

Each infeed conveyor assembly 72 includes a metering conveyor 80 disposed downstream of the associated accumulator conveyor 70 and an accelerator conveyor 82 disposed downstream of the metering conveyor 80. The metering conveyor 80 "pulls a gap" by accelerating bags away from the accumulator conveyor 70 one at a time and feeds the bags to the accelerator conveyor 82. It runs at about twice the speed of the accumulator conveyor 70. The accelerator conveyor 82 further accelerates the bags to a velocity of about four to five times at which they are delivered by the metering conveyor 80. The accelerator conveyor 82 can be pivoted vertically to raise and lower its downstream end relative to its upstream end in order to alter the height from which bags are deposited from the downstream end of the conveyor 82, permitting the discharge height to be progressively raised as successive layers of bags are deposited on the pick table assembly 54 during the formation of a group. In addition, the downstream end of the accelerator conveyor 82 can be extended and retracted longitudinally so as to selectively move the discharge end of the accelerator conveyor 82 into and out of a working position over or adjacent to the pick table assembly 54. The infeed conveyor assembly 72 will be described in more detail in conjunction with FIGS. 2-6 below.

Still referring to FIG. 1, each pick table assembly 54 or 56 includes a pick table or shuttle 182 that is movable laterally of the system 20 so as to permit bags being delivered by the associated infeed conveyor assembly 72 to be deposited side-by-side across the length of the pick table assembly 54 or 56 and thus to form individual layers in a stack. All of these structures will be described in more detail below in conjunction with FIGS. 9-17.

Still referring to FIG. 1, the robot 58 comprises a base 100, an arm assembly 102 mounted on the base, and a pick and place tool or end of arm tool (EOAT) 104 mounted on the end of the arm assembly 102. The arm assembly 102 is rotatable about the base 100 along a vertical axis through an angular range of up to 360 deg. The arm assembly 102 includes a first arm 106 and a second arm 108 having a first end that is pivotally mounted on an upper end of the first arm 106 and a second end on which is supported the EOAT 104.

Referring briefly to FIGS. 17-23, the EOAT 104 includes a frame or platform 110 suspended from the second end of the second arm 108 of the robot 58. First and second jaws 112 and 114 can be pivoted toward and away from each other to selectively pick and release a group of stacked bags. First and second hold down plates 116 and 118 are positioned between the jaws 112 and 114 and can be individually raised and lowered to hold down the top of a group of bags being transported by the tool 104. In a preferred implementation, the hold down plates 116 and 118 are controlled to extend into contact with the bag group after the jaws 112 and 114 close during a pick process and to lift away from the group after the jaws open during a place process. All of these structures will be described in more detail below in conjunction with FIGS. 17-23.

Still referring to FIG. 1, the bin conveyor assembly 60 includes first and second transfer conveyors 120 and 121, first and second staging conveyors 122 and 123, and feed conveyor 124, all of which have driven rollers. The staging conveyors 122 and 123 are located in the respective bin staging areas BS1 and BS2, The feed conveyor 124 supplies empty bins to the center of the system and feeds those bins to a selected transfer conveyor 120 or 121. Each transfer conveyor 120 or 121 selectively transfers an empty bin to the associated staging conveyor 122 or 123 or transfers a full bin from the associated staging conveyor 122 or 123 to a take-away conveyor (not shown) at the rear of the system 20. Each staging conveyor 122 or 123 is capable of moving bins back and forth (front to rear) between the staging area BS1 or BS2 in which the bin is filled and the associated transfer conveyor 120 or 121. Mechanisms may be provided in the staging areas BS1 and BS2 to assure proper positioning of the bins for receiving groups of bags from the robot 58. Toward this end, first and second (front and rear) pivoting arms 126 and 128 are provided near the front and back of each staging conveyor 122 or 123, and first and second paddles 130 and 132 are provided near the left and right sides of each staging conveyor 122 or 123 for selectively engaging and squaring up the sides of a bin. In one possible configuration, only one of the paddles 130 is movable and is operable to push the bin up against the other paddle 132, which serves as a datum.

Turning now to FIGS. 2-8, the infeed conveyor assembly 70, including the metering conveyor 80 and the accelerator conveyor 82, is mounted on a main frame 140. The metering conveyor 80 is mounted on the main frame 140 by a first support frame 142. Conveyor 80 comprises an endless belt 144 driven by a first electric motor 146. Conveyor 80 is about 0.75 m long. The accelerator conveyor 82 similarly comprises a support frame 148 mounted on the main frame 140 and, additionally, comprises an endless belt 150 driven by a second electric motor 152. As mentioned above, the accelerator conveyor 82 may be driven at a speed that is about four to five times that of the metering conveyor 80. The front end of the support frame 148 of the accelerator conveyor 82 is pivotally attached to the rear end of the support frame 142 for the metering conveyor 80 at a horizontal pivot axis 153. The support frame 148 can be pivoted about this pivot axis through an angle of about 5 to 25 deg., and more typically through an angle of about 15 deg., by a pneumatic cylinder 154 and opposed extendable support struts 156. The downstream or rear end portion of the accelerator conveyor 82 can be driven toward and away from the remainder of the accelerator conveyer 82 by a cylinder 158 to extend or retract the length of the conveyor 82. The cylinder 158 has a barrel affixed to the subframe 148 and a rod affixed to the end of the accelerator conveyor 82.

The accelerator conveyor 82 is about 0.75 m long in its retracted state and about 1.2 m long in its extended state. Compare FIG. 5 to FIG. 6. The cylinders 154 and 158 are controlled by respective servo valves 160 and 162 that permit the cylinders to assume any desired position in their respective strokes.

Turning now to FIGS. 9-16, pick table assembly 54 (pick table assembly 56 being identical to pick table assembly 54) comprises a main frame 180 extending laterally of the system 20 and a shuttle 182 mounted on the main frame 180. A timing belt 184 and first and second linear bearings and associated linear rails 186 and 188 are mounted on the main frame 180. The shuttle 182 is mounted on the timing belt and the rails 186 and 188 so as to move longitudinally of the remainder of the pick table assembly 54 (laterally of the system) upon timing belt movement. The timing belt 184 is driven by a servo motor 190 coupled to a driven shaft 192. The timing belt 184 provides for a shuttle range of motion on the order of at least 500 mm, possibly of more of more than 750 mm, or 900 mm or more.

Still referring FIGS. 9-16, the shuttle 182 includes a base 200, a backplate 202, and the side plates 204 and 206. The base supports the side plates 204 and 206 at opposed ends thereof. Supports in the form of rods 208 are mounted on the base 200. The shuttle 182 of this embodiment is about 1.0 m long, (as measured by the distance between the side plates 204 and 206) by 0.5 m deep, (as measured from the front of the support rods 208 to the front surface of the backplate 202), by 0.3 m high (as measured from the average height of the support rods 208 to the top of the fully-raised backplate 202). In this embodiment, the alternating support rods 208 (rods 1, 3, 5, etc.) are disposed above the level of intervening rods (rods 2, 4, 6, etc.) to promote stability of stacked bags thereon by inhibiting the bags from sliding side-to-side. The higher rods are disposed about 1.2 cm above the lower rods. In addition, all of the support rods 208 are inclined at a relatively shallow angle from the front of the shuttle 182 to the rear on the order of 5 to 10 deg. This inclination promotes the sliding of bags or other packages against the backplate 202.

Figure 9:
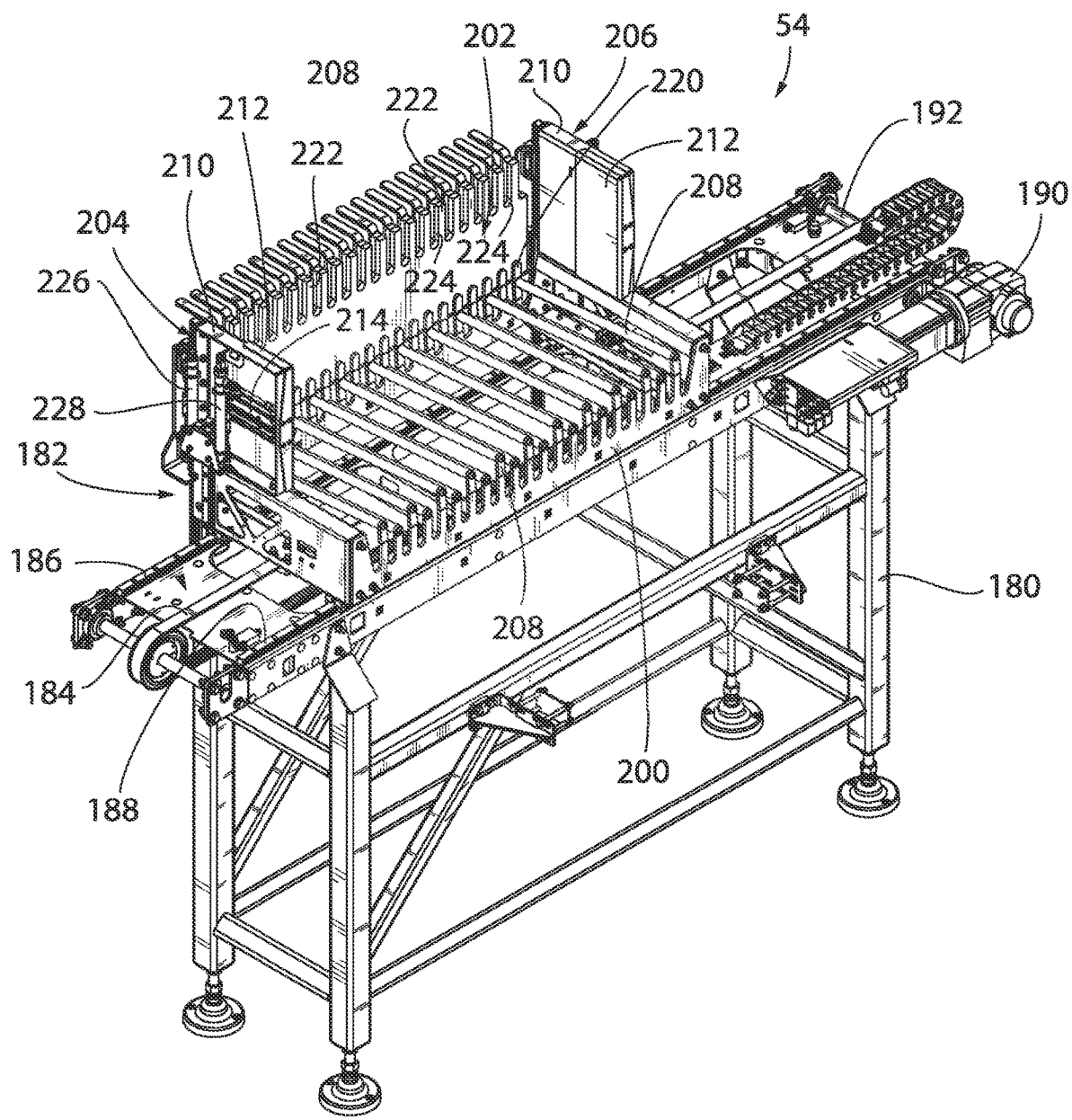
FIG. 9 is an isometric view of a pick table assembly of the system of FIG. 1.
Figure 14:
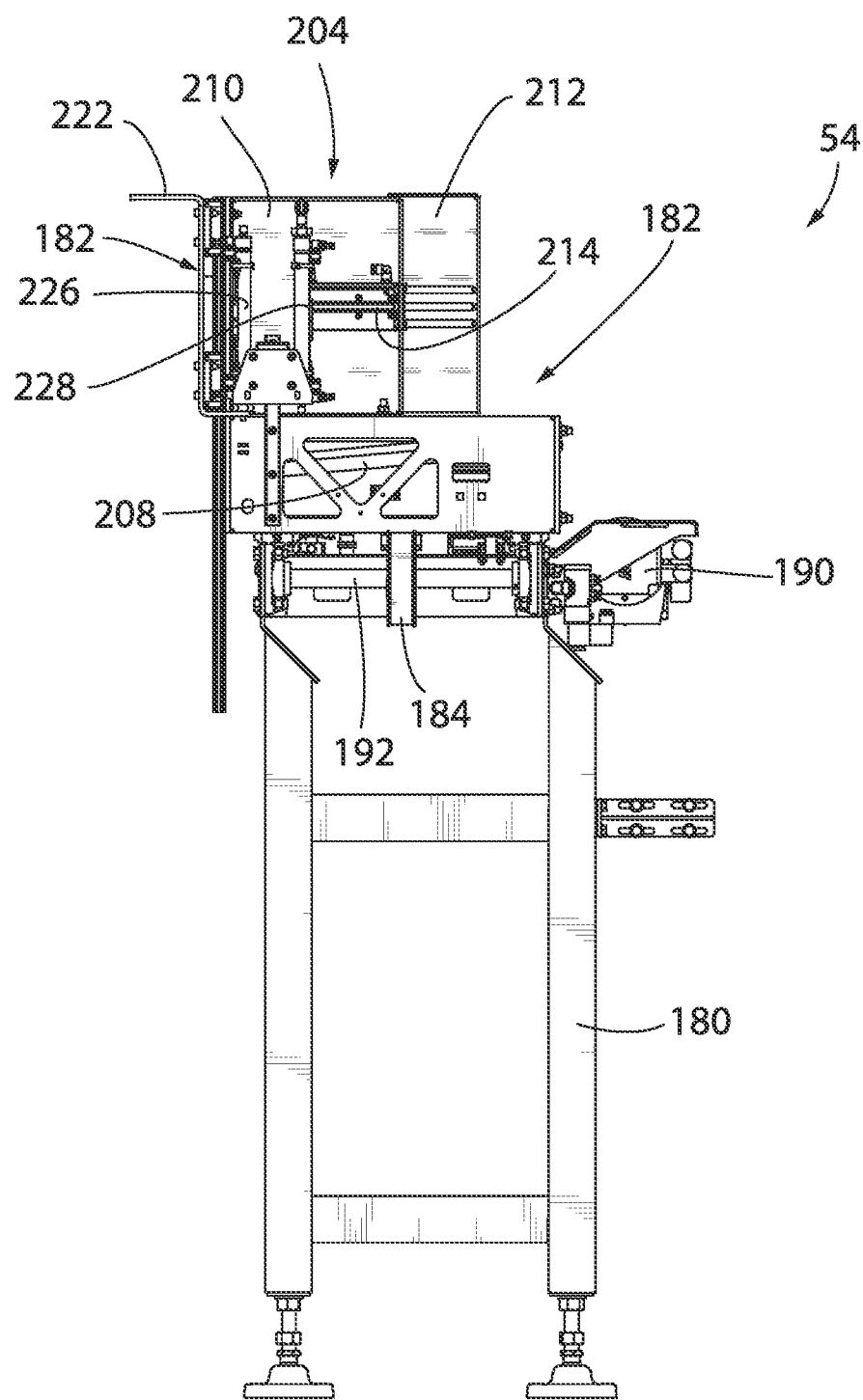
FIG. 14 is a left side elevation view of the pick table assembly of FIGS. 9-13.
Figure 15:
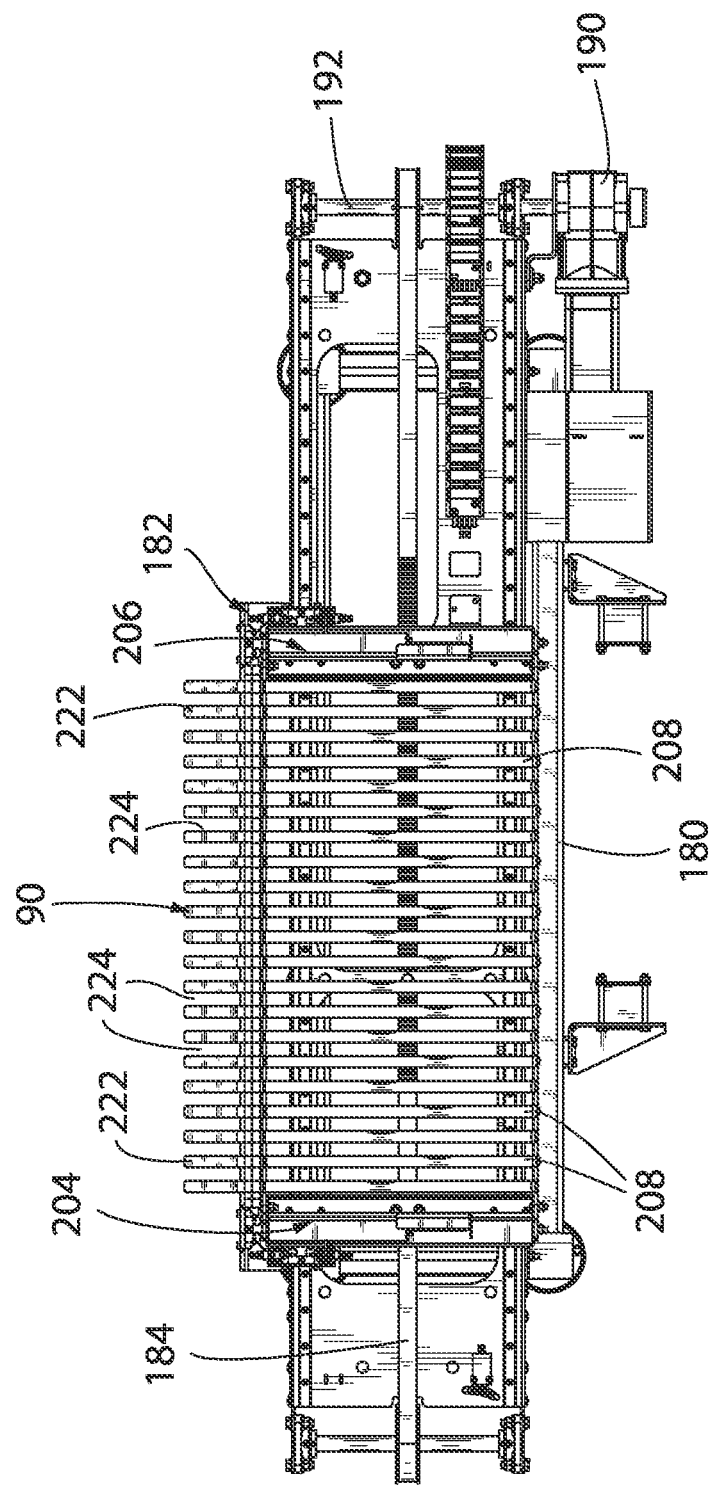
FIG. 15 is a top plan view of the pick table assembly of FIGS. 9-14.
Figure 16:
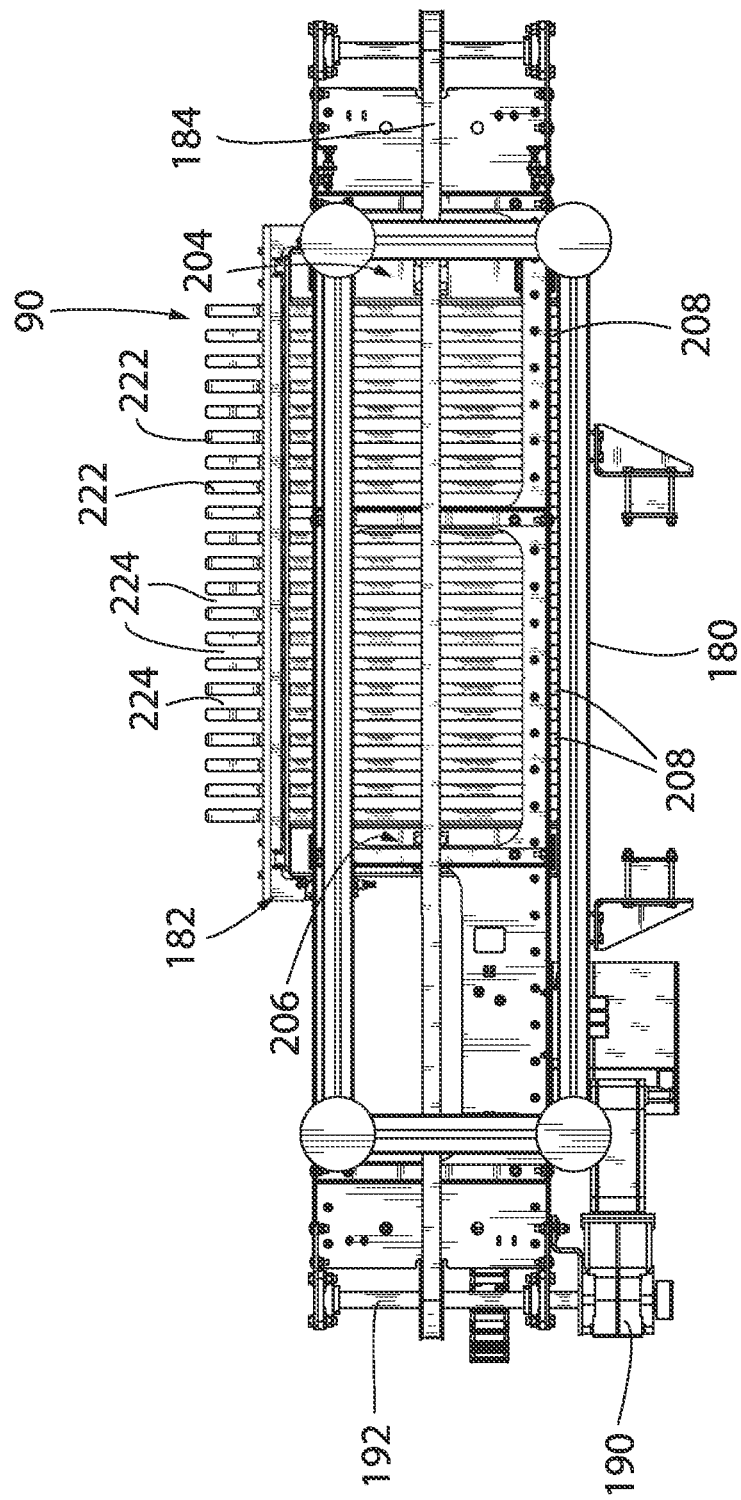
FIG. 16 is a bottom plan view of the pick table assembly of FIGS. 9-15.
Figure 17:
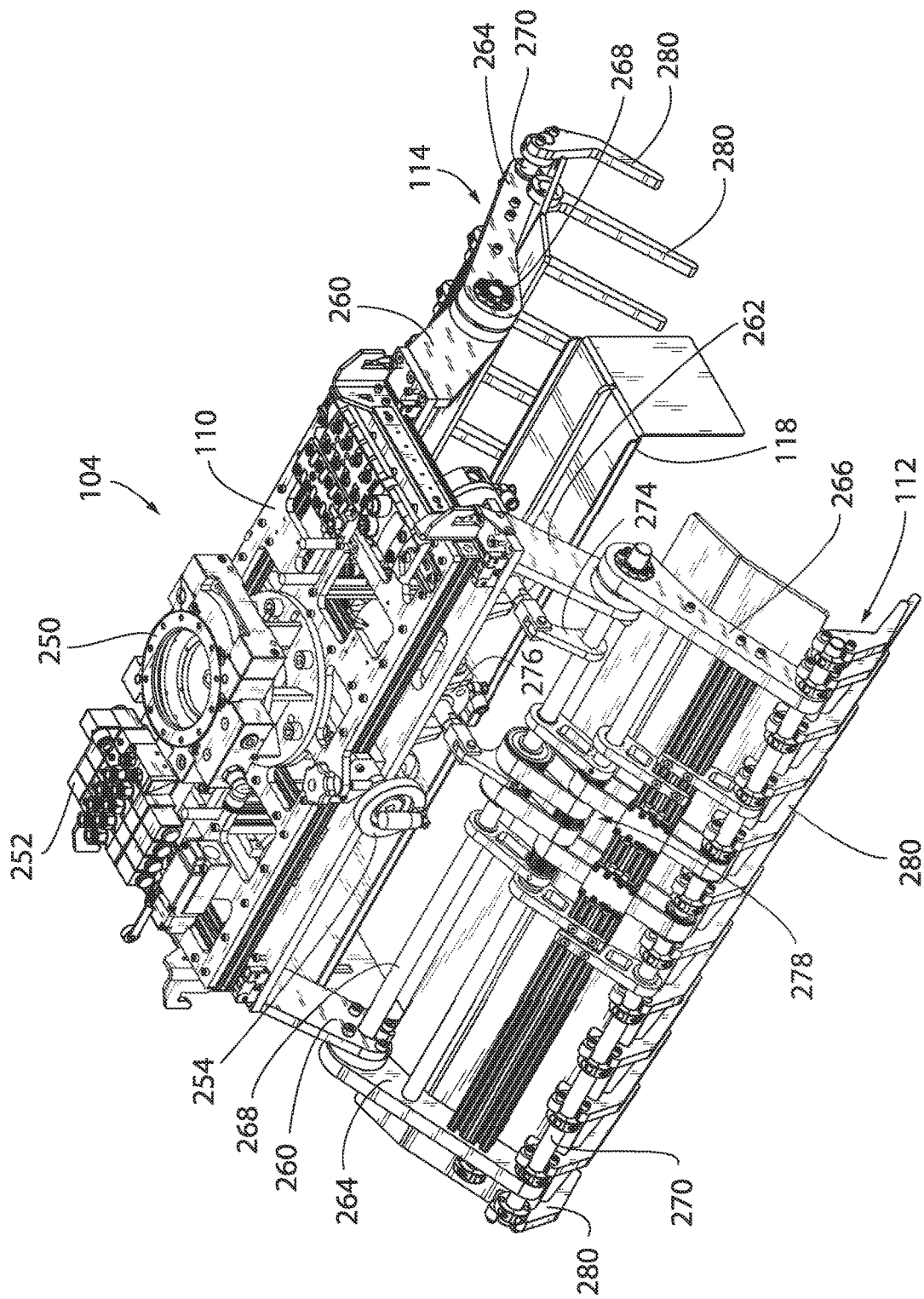
FIG. 17 as an isometric view of an end of arm tool of the system of FIG. 1.
Figure 18:
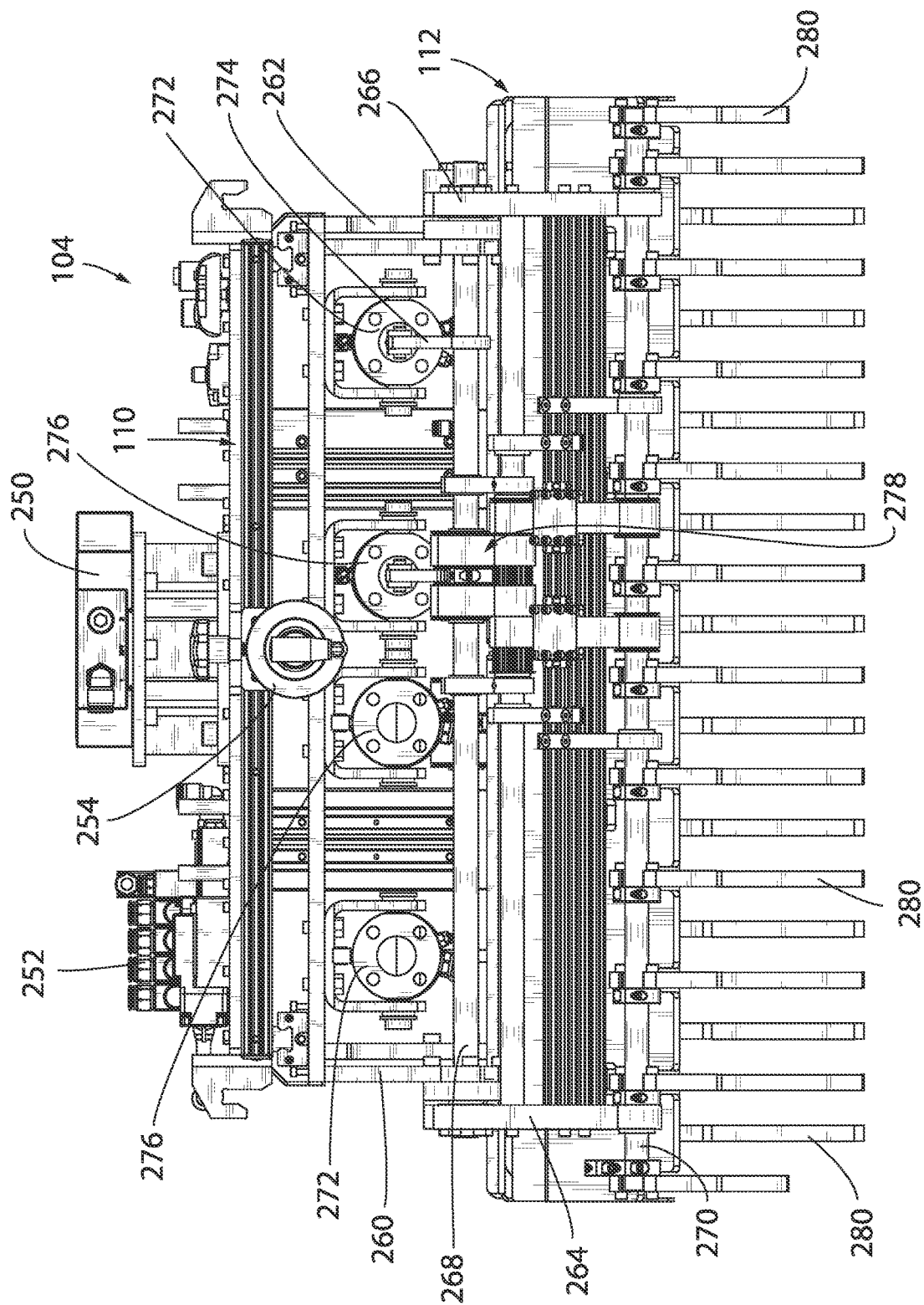
FIG. 18 is a front elevation view of the end of arm tool of FIG. 17.
Figure 19:
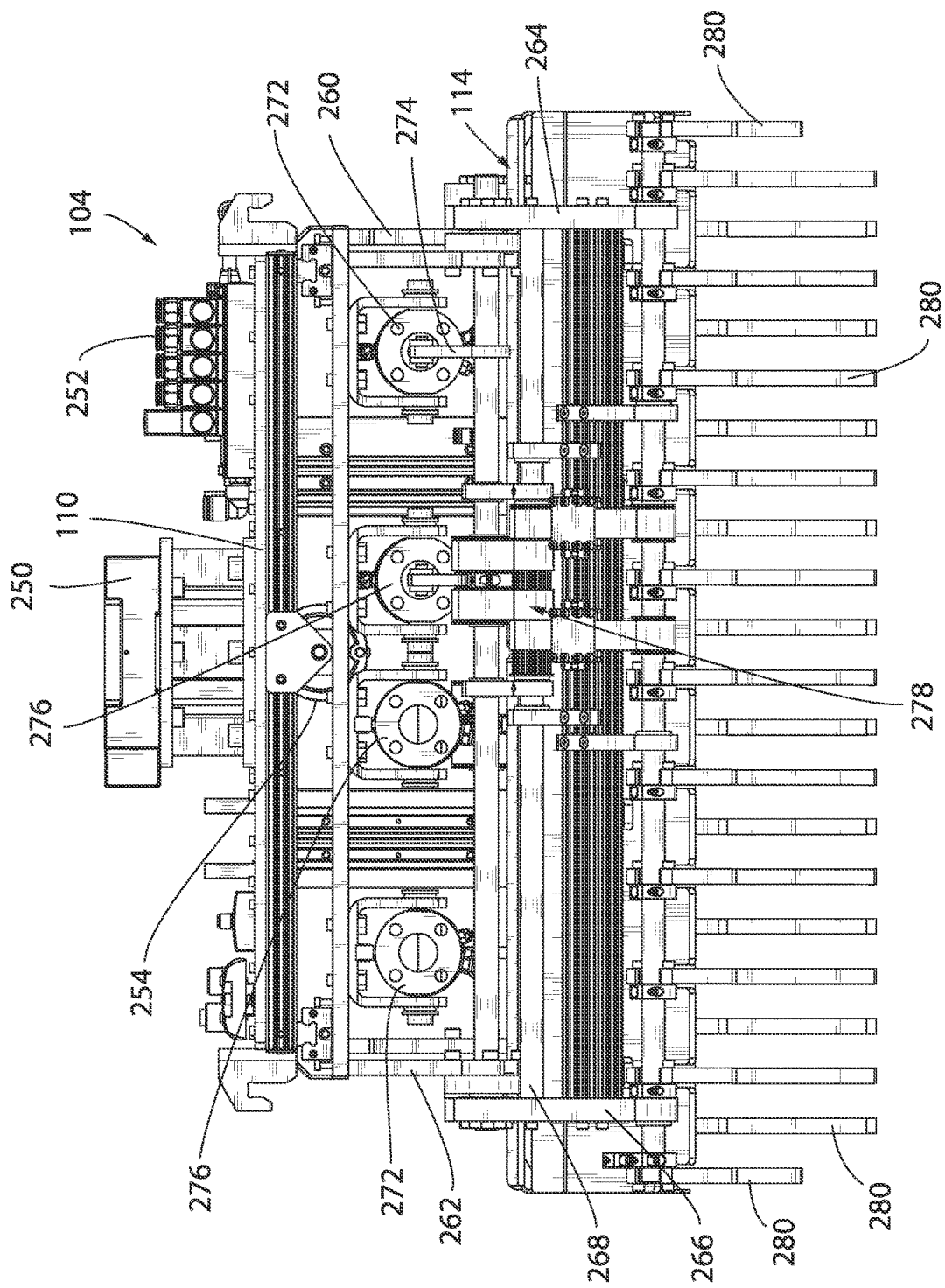
FIG. 19 is a rear elevation view of the end of arm tool of FIGS. 17 and 18.
Figure 20:
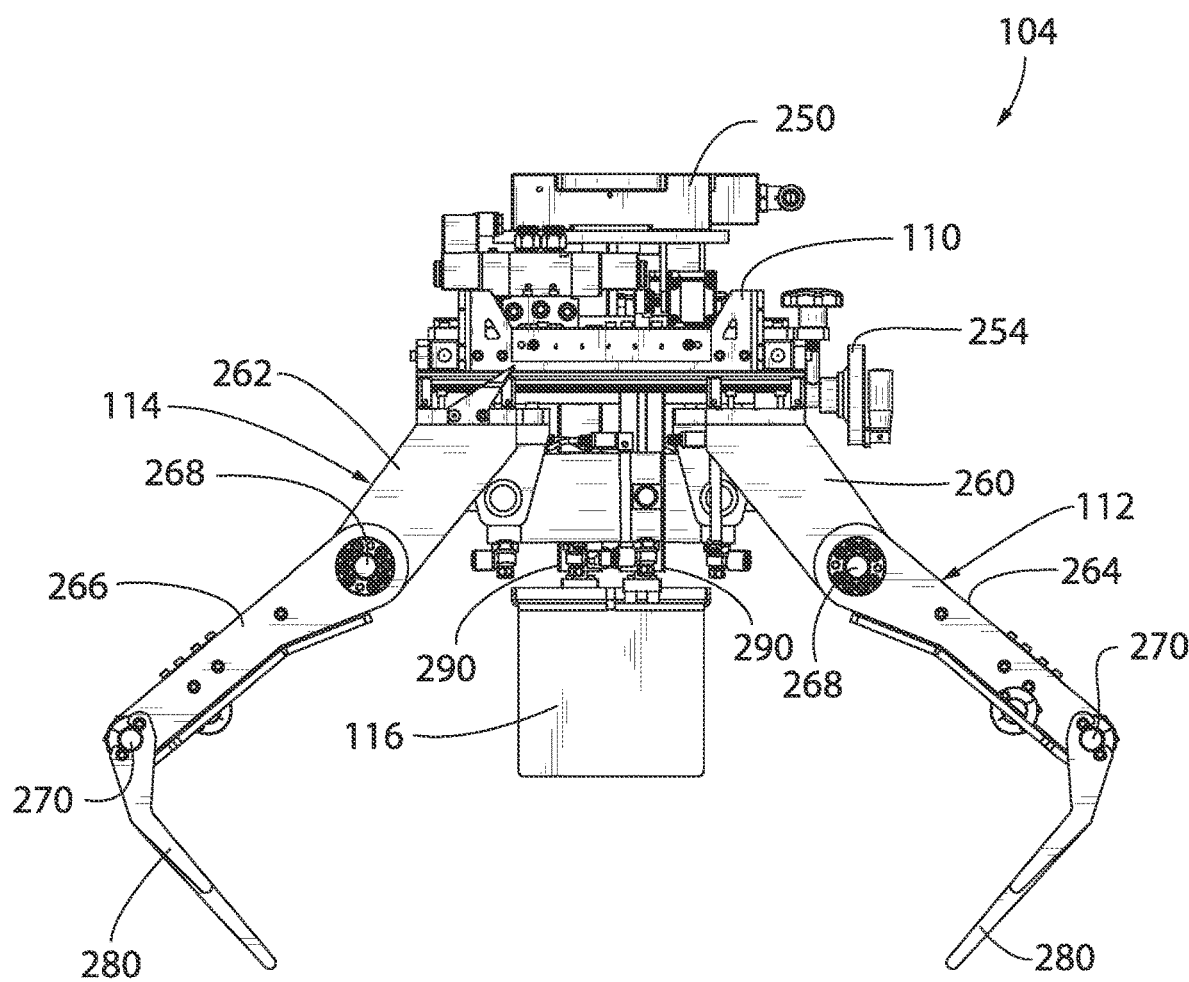
FIG. 20 is a left side elevation view of the end of arm tool of FIGS. 17-19, showing the jaws of the tool in an open position.

Referring to FIGS. 9 and 14, the side plates 204 and 206 could be of fixed dimensions. However, in the illustrated embodiment, each side plate includes a stationary rear portion 210 and a movable front portion 212. The front portion 212 of each side plate is extendable and retractable relative to the stationary rear portion 210 in order to accommodate bags of different sizes. That is, smaller bags (on the order of three pounds) can be stacked more easily if the end of the accelerator conveyor 82 is positioned more centrally over the shuttle 182, which positioning would be blocked by the side plate portions 212 if the side plate portions 212 were in their fully-extended position. In the illustrated embodiment, the stationary portion 210 of each side plate 204 or 206 is about 25 cm long, and the movable portion 212 can be driven to extend an additional 10 cm forwardly of the front edge of the stationary portion 210. The movable portion 212 of each side plate 204 or 206 is driven by a pneumatic cylinder 214 (FIGS. 9 and 14) having a barrel affixed to the stationary portion 210 and a rod attached to the movable portion 212.

Still referring to FIGS. 9-16, the backplate 202 of this embodiment extends the full length of the shuttle 182. It has a planar inner surface that extends vertically from upper to lower ends thereof. A number of lower slots 220 provide clearance for the EOAT fingers 280. A number of upper fingers or tines 222 are provided with slots 224 formed between them. The width of the slots 224 and the spacing between the slots 224 is set to accommodate the fingers 222 on the jaws 112 and 114 of the EOAT 104 as described below. In the illustrated embodiment, 23 fingers are provided, with a gap or slot 224 between each adjacent set of fingers of 2.25 cm. Each finger 222, as measured by the depths of the slots 224 between them, is about 10 cm high. With the exception of the two end-most fingers, the fingers 222 are bent outwardly at an angle of about 90 deg. at their upper ends to form a support surface to prevent any bags that slide beyond the back of the backplate 22 from falling off the shuttle 182.

Figure 10:
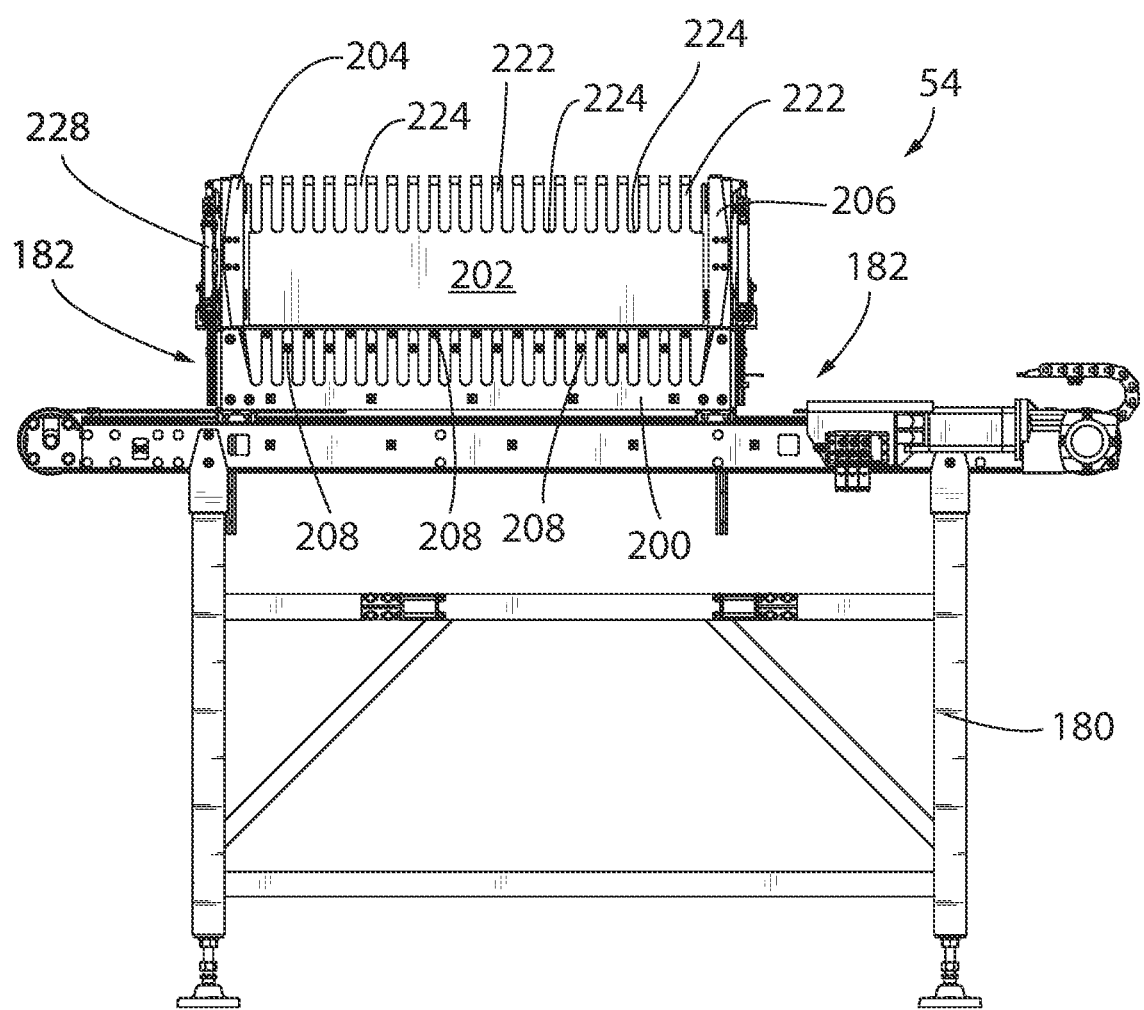
FIG. 10 is a front elevation view of the pick table assembly of FIG. 9, showing the backplate thereof in its fully raised position.
Figure 11:
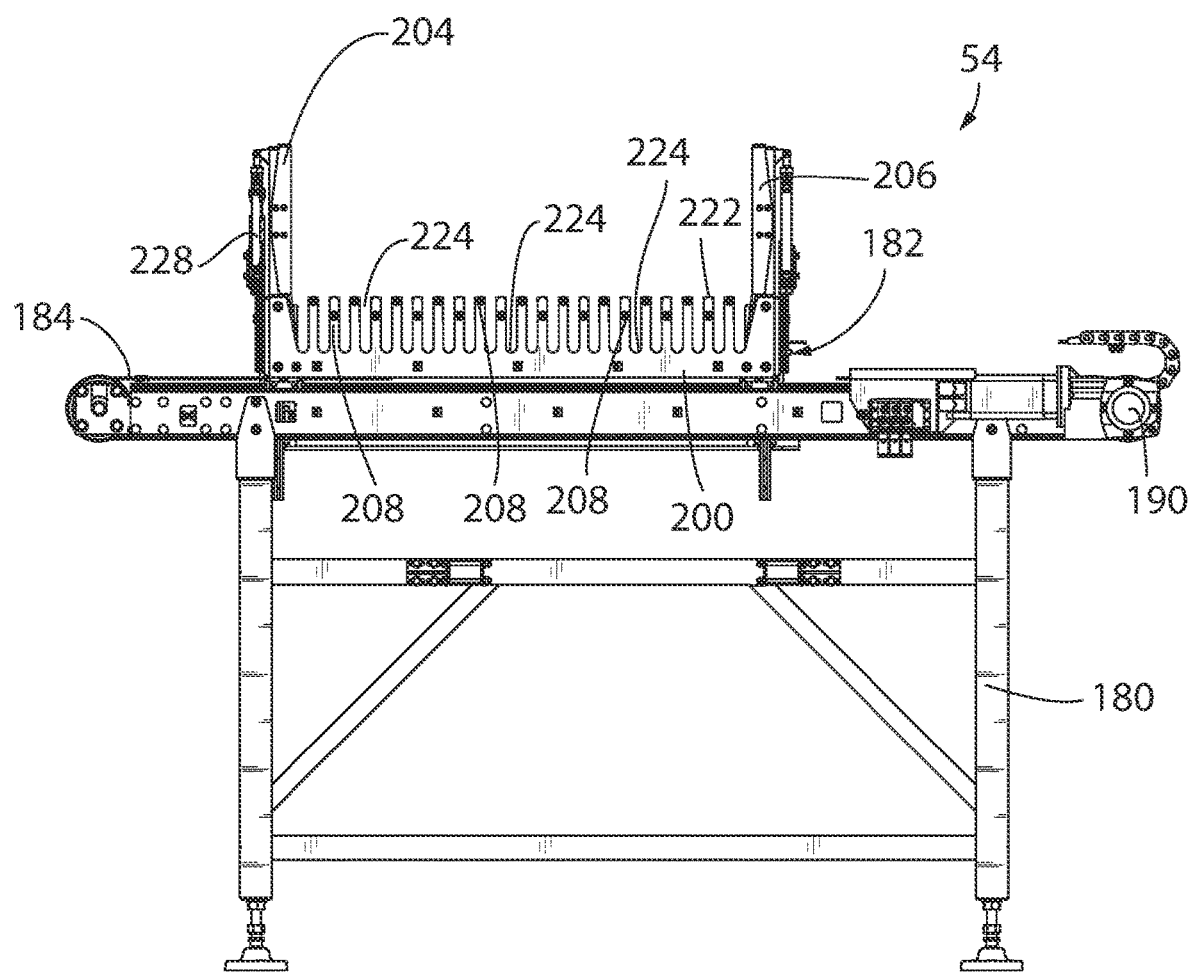
FIG. 11 is a front elevation view of the pick table assembly of FIGS. 9 and 10, showing the backplate thereof in its fully lowered position.
Figure 12:
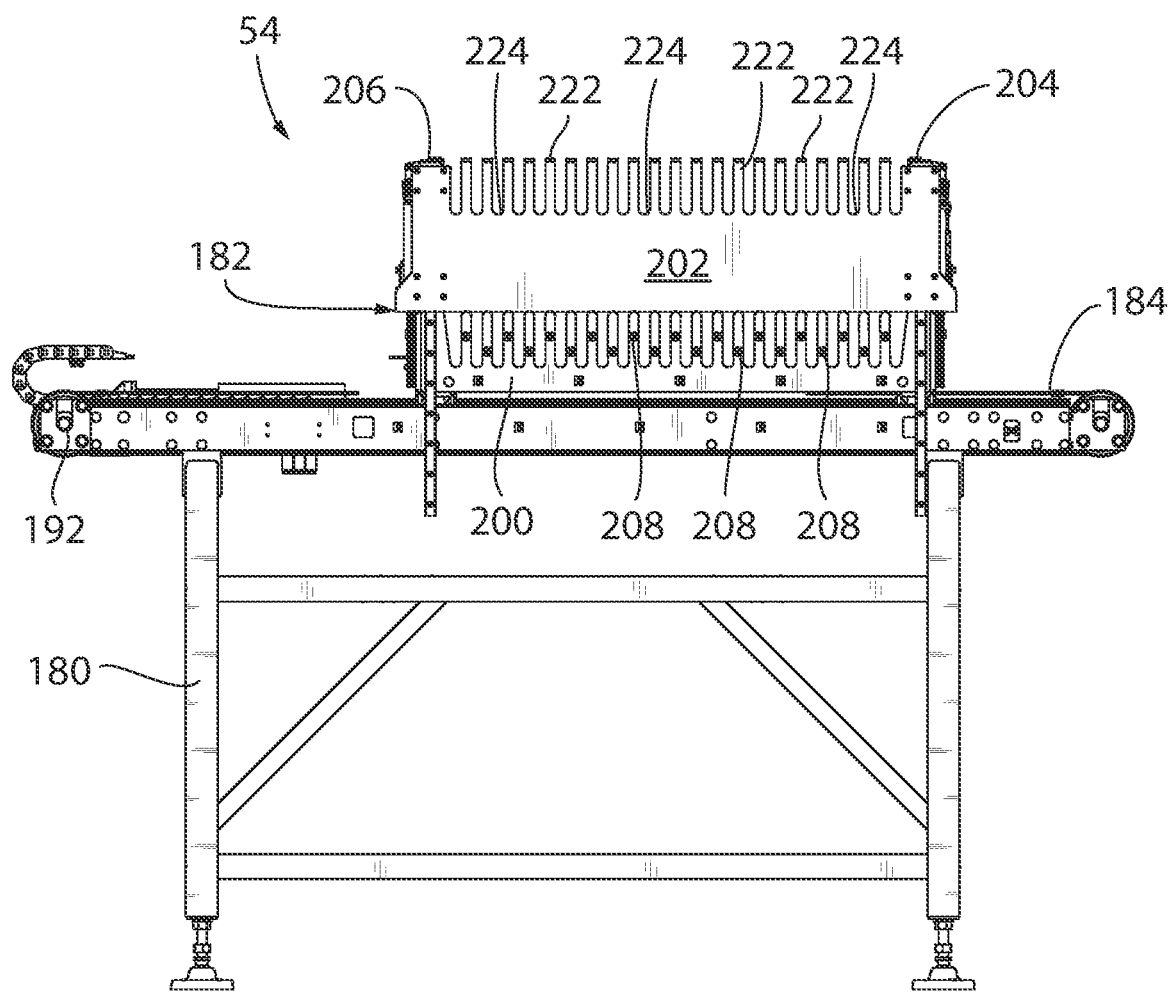
FIG. 12 is a rear elevation view of the pick table assembly of FIGS. 9-11, showing the backplate thereof in its fully raised position.
Figure 13:
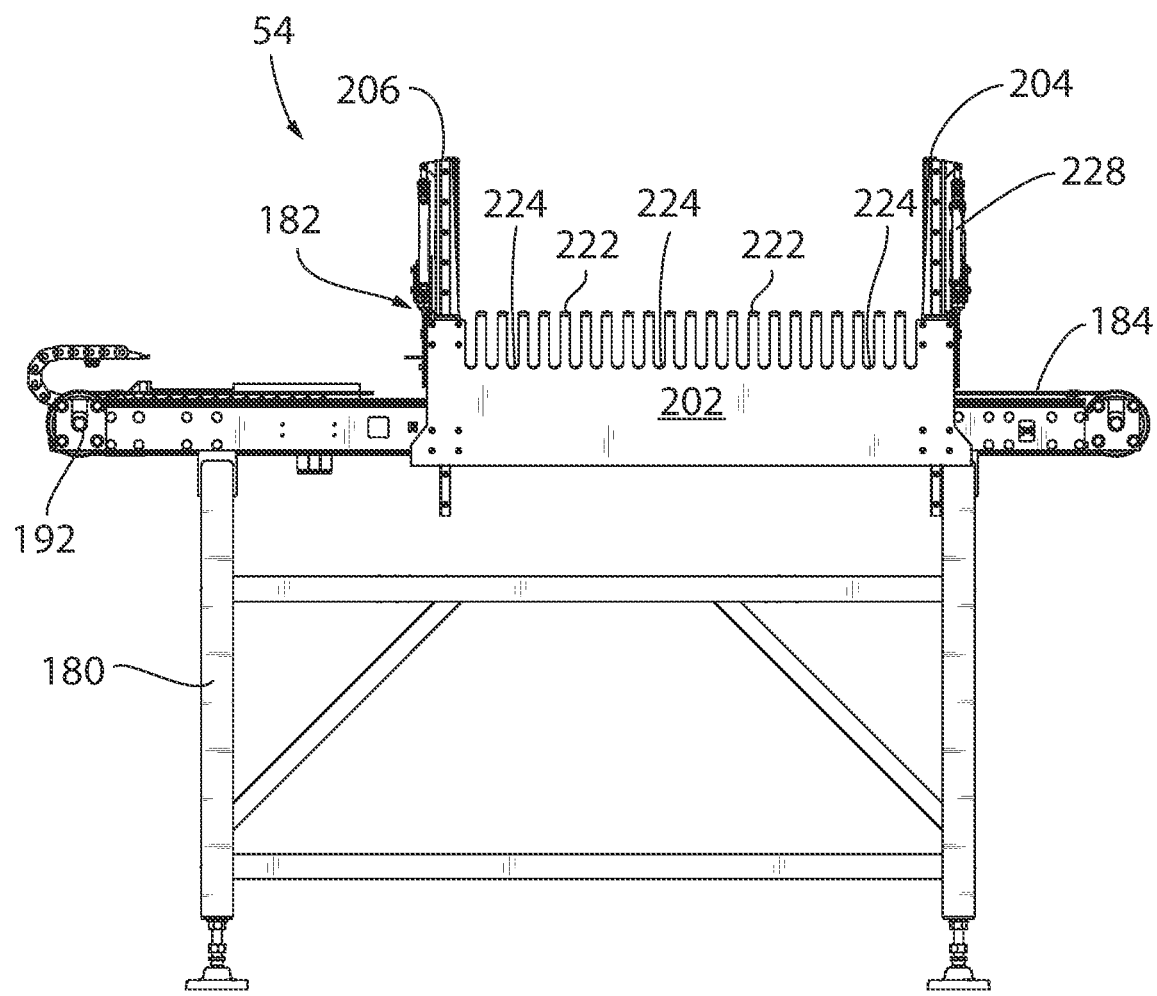
FIG. 13 is a rear elevation view of the pick table assembly of FIGS. 9-12, showing the backplate thereof in its fully lowered position.

Still referring to FIGS. 9-16, the backplate 202 is raiseable and lowerable in two stages, from a fully-raised position, seen in FIGS. 10 and 12, to a midrange position, to a fully-lowered position, seen in FIGS. 11 and 13. The total stroke between the fully-raised and fully-lowered positions is 30 cm in this embodiment. This two-stage motion is achieved via operation of first and second vertical cylinders 226 and 228 mounted on a common linear bearing. The first cylinder 226 can be extended to raise the backplate 202 from its fully lowered to its mid position, and the second cylinder 228 can be extended to raise the backplate 202 to its fully-raised position. The barrel end of each cylinder 226 or 228 is attached to the side plate 204. The rod end of each cylinder 226 or 228 is attached to the linear bearing.

Turning now to FIGS. 17-23, the end of arm tool (EOAT) 104 comprises the afore-described support frame 110, first and second jaws 112 and 114, and first and second hold down plates 116 and 118. The support frame 110 comprises an aluminum or other metal casting or weldment having a central hub 250 for connection to the end of the robot arm 108 (FIG. 1). Solenoid valve blocks 252 are mounted on its upper surface. The jaws 112 and 114 are mounted on opposed ends of a threaded lead screw (not shown) supported on the bottom surface of the support frame 110. The jaws 112 and 114 can be moved toward and away from one another by operation of a hand crank 254 to accommodate different sized bags. Rotation of the hand crank 254 turns the threaded lead screw to move the jaws 112 and 114 inwardly or outwardly along the lead screw. The combined stroke or range of movement of the two jaws 112 and 114 toward or away from one another is on the order of 15 cm in the illustrated embodiment.

Still referring to FIGS. 17-23, each of the first and second jaws 112 and 114 is identical. Referring to the jaw 112 by way of example, the jaw 112 includes first and second opposed stationary arms 260 and 262, each having a first end mounted on the support frame 110 and a second end. The jaw additionally includes first the second opposed pivot arms 264 and 266, each of which has an upper or first end mounted on a first rotary shaft 268 that is borne by the second end of the stationary arms 260 and 262. The outer end of each of the pivot arms 264 and 266 supports a second rotary shaft 270. The first rotary shaft 268 is driven to rotate through an angle of about 35 deg. by a pneumatic cylinder 272 that is coupled to the rotary shaft 268 by a crank 274. The second rotary shaft 270 is driven to rotate through an angle of about 30 deg. by a second pneumatic cylinder 276 that is coupled to the second rotary shaft 270 by a belt assembly 278 including pulleys, belts, and links.

Still referring to FIGS. 17-23, each of the jaws 112 and 114 has a plurality of spaced hooked fingers 280. Each finger 280 has a first portion mounted on the rotatable shaft 270 and a second portion extending at an acute angle from the outer end of the first portion. With the exception of the outermost fingers, which are shorter for reasons that will become apparent shortly, the figures are about 8 cm long.

Figure 21:
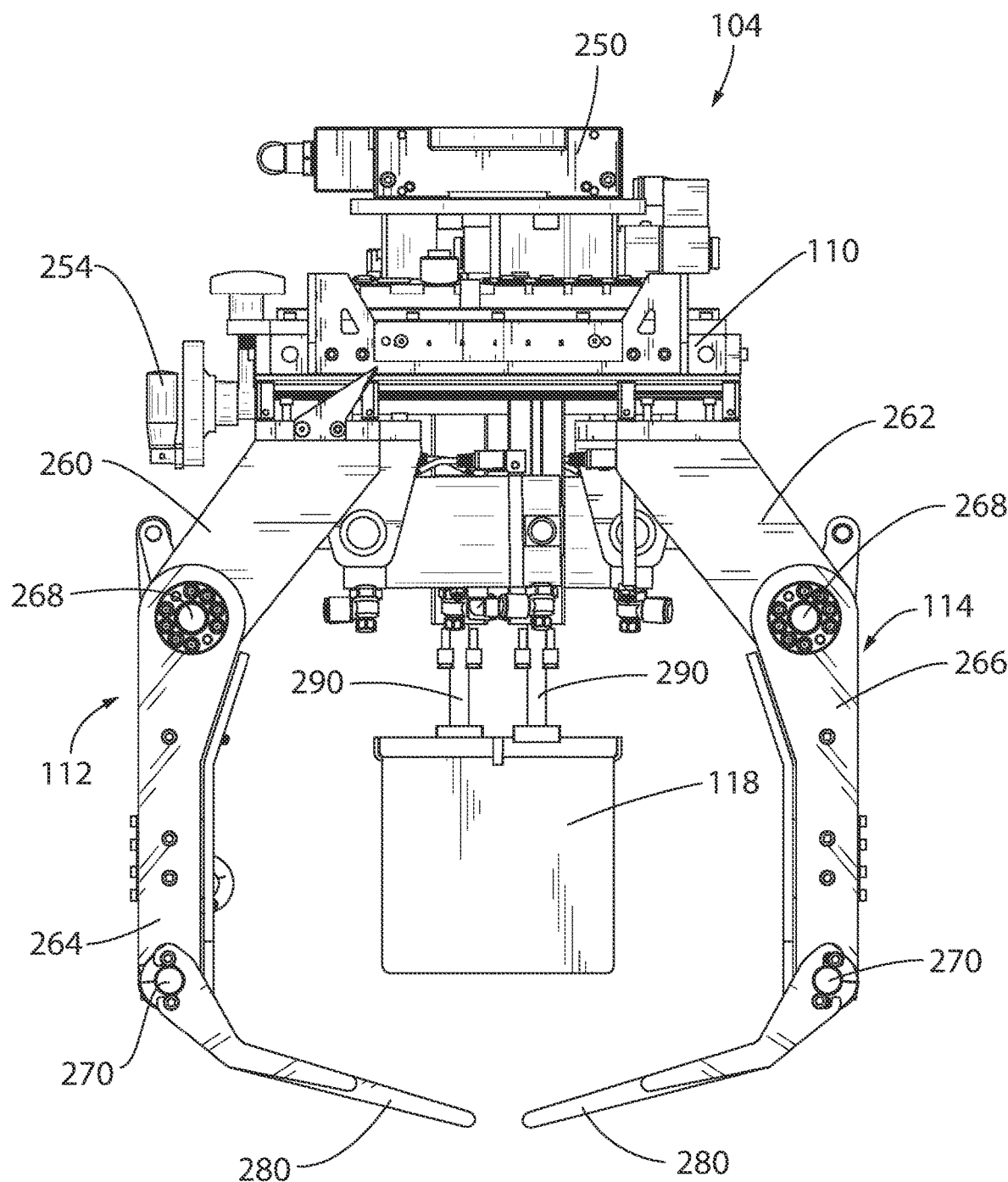
FIG. 21 is a right side elevation view of the end of arm tool of FIGS. 17-20, showing the jaws of the tool in a closed position.
Figure 22:
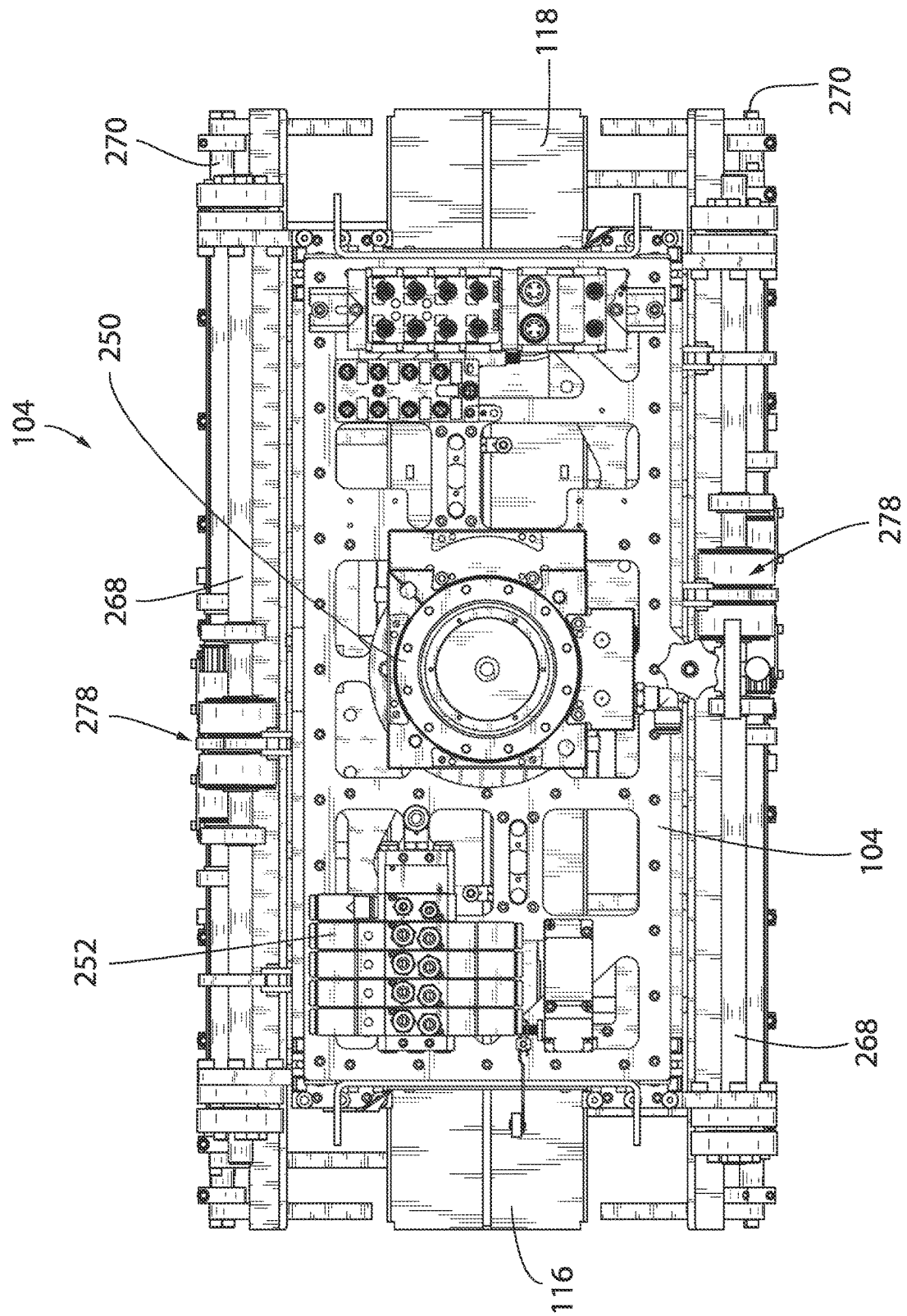
FIG. 22 is a top plan view of the end of arm tool of FIGS. 17-21.
Figure 23:
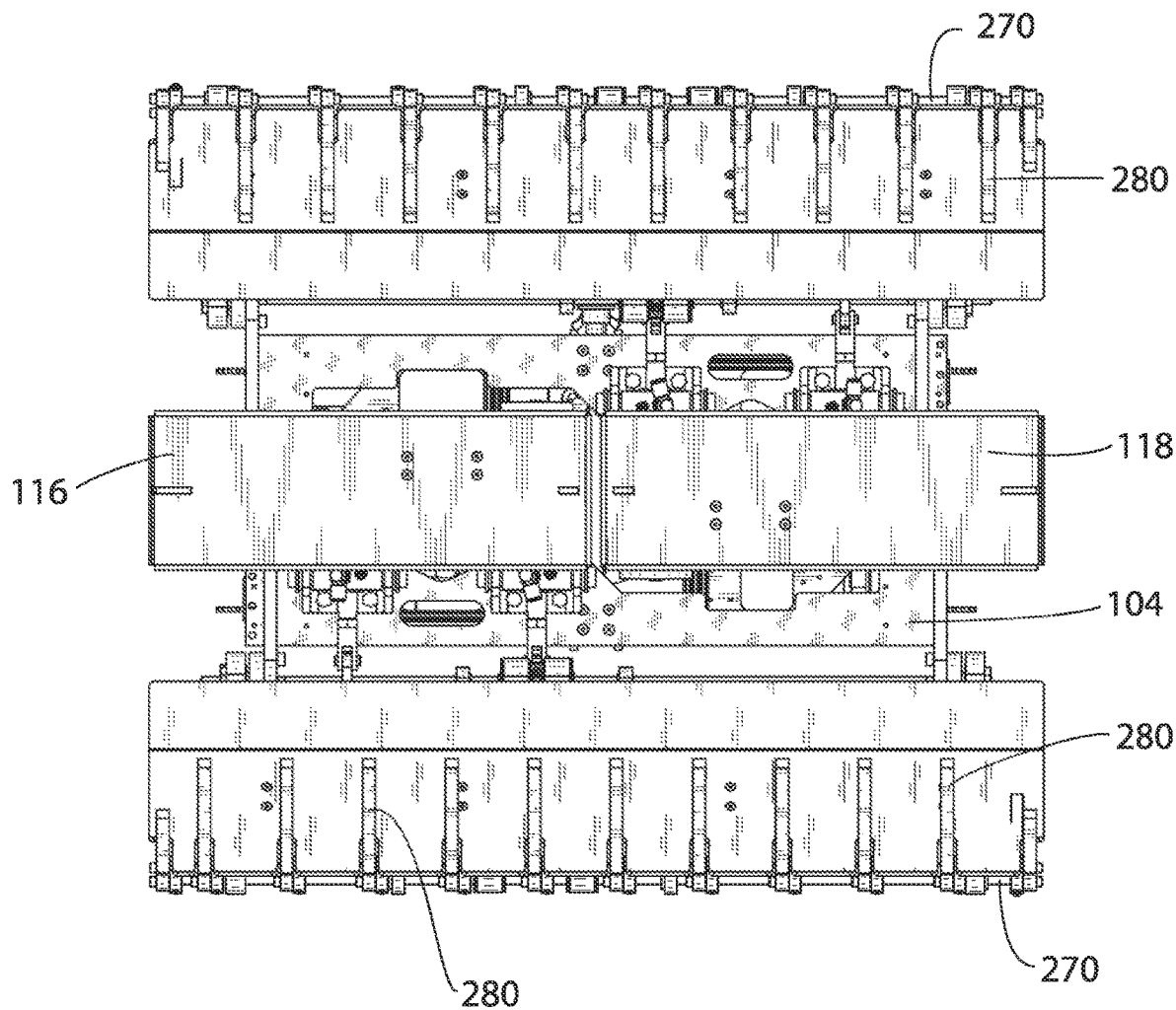
FIG. 23 is a bottom plan view of the end of arm tool of FIGS. 17-22.

The fingers of the two jaws 112 and 114 are staggered relative to one another so that, when the jaws are fully rotated to their fully-closed position beyond that seen in of FIG. 21, all fingers 280 except the outermost fingers of one jaw 112 are positioned between two adjacent fingers 280 of the opposite jaw 114. The outermost fingers 280 of each jaw 112, 114 are aligned with one another and move closely adjacent to one another when the jaws are fully closed.

Still referring to FIGS. 17-23, and to FIG. 20-23 in particular, the two hold down plates 116 and 118 are mirror images of each other. Both are mounted on the bottom of the support frame 110 so as to be driven vertically toward and away from the support frame 110 by a respective pneumatic cylinder 290. The maximum stroke of this movement is on the order of 18 cm. Each hold down plate 116, 118 includes a planar horizontal bottom surface extending the length of the hold down plate and an outer guide that extends downwardly from the end of the hold down plate. In operation, downward movement of the hold down plate 116 or 118 is limited by compressive contact with the underlying bags. Two hold down plates 116 and 118 are provided in this embodiment to accommodate at least some degree of unevenness of group height caused by variations in bag thickness.

Figure 24:
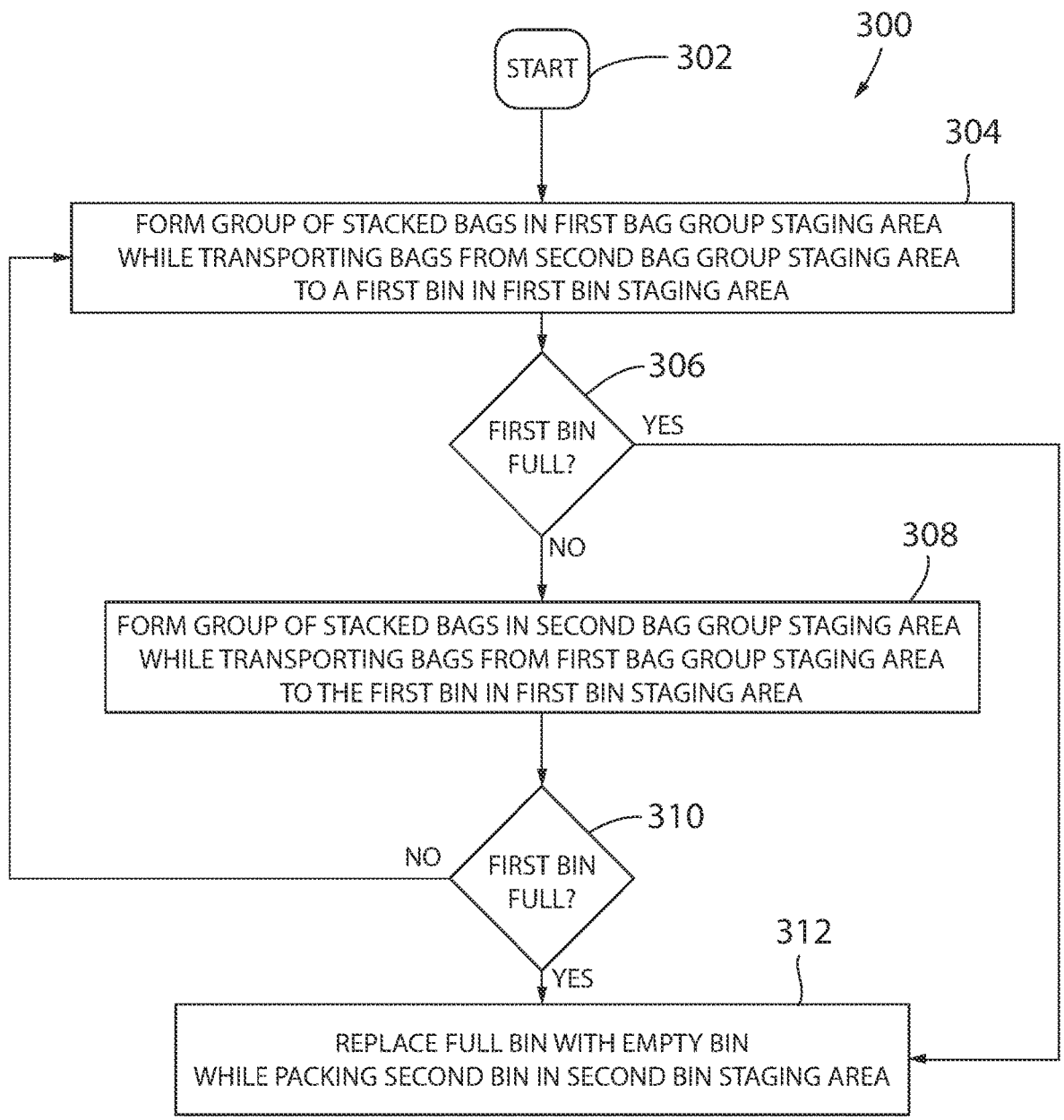
FIG. 24 is a flowchart of a process for packing bins using the system of FIGS. 1-23.

Operation of the system as described above can be appreciated from the process 300 illustrated schematically by flowchart of FIG. 24. The process 300, and all processes described herein, are performed under control of the system's controller 75. That controller may be a single programmed controller or a number of interlinked controllers connected to one another, e.g., by a CAN BUS.

Process 300 is identical for each lane, with different parts of the process being performed in different lanes at any given time. The process 300 proceeds from START at block 302 and proceeds to block 304, where a first group of stacked bags is formed on the first pick table assembly 54 in the first bag group staging area GS1 as described below in connection with FIG. 25. The number of bags in each layer and total number of bags may vary depending on the intended placement of the group of bags in the bin. Importantly, during bag group forming process, another group of stacked bags is being transported from the second bag group staging area GS2 to a bin in first bin staging area BS1. Next, in block 306, the process 300 determines whether the first bin is fully packed. If not, the process proceeds to block 308, where the now-formed group of bags in the first bag group staging area GS1 is picked from the first pick table assembly 54 and placed in the first bin in the first bin staging area BS1 while another group of bags is formed on the pick table assembly 56 in the second bag group staging area.

The full bin inquiry is then repeated in block 310. A NO answer causes the process 300 to return to block 302, and the first bin continues to be packed. A YES answer to either inquiry block 306 or 310 leads to block 312 and to the packing of a second bin in the second bin staging area BS2 while the full bin in the first staging area BS1 is replaced. That process proceeds exactly as described above in connection with blocks 302-310 except for the fact that the bin staging area subject to packing is second bin staging area BS2 rather than the first bin staging area BS1. The process 300 is then repeated on a continuous basis, with a full bin in one staging area being replaced while a bin is being filled in the other bin staging area is being packed.

As a result of this sequence, a group of stacked bags is always available for transport, and a bin is always available for packing. That is, one group of bags is always being formed while the other is being picked and placed. The ability to place groups of bags in bins in either bin staging area BS1 or BS2 assures continued bin packing even if a full bin in one staging area is being replaced with an empty bin. The pick and place EOAT 104 therefore is always either picking or placing groups of bags without any downtime between pick and place operations. Packing rates therefore are maximized.

Figure 25:
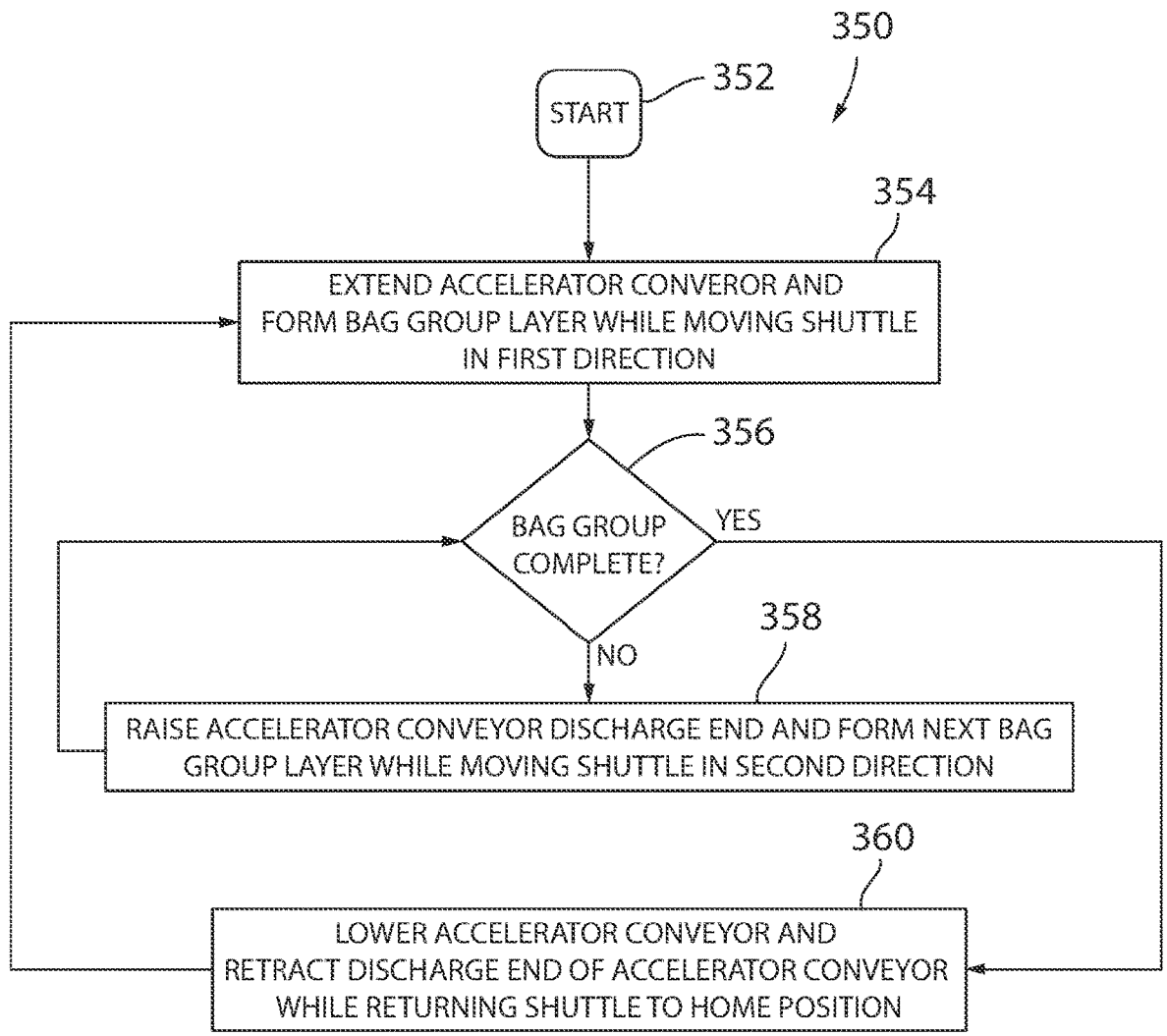
FIG. 25 is a flowchart of a bag group forming process of the bin packing process of FIG. 24.

Referring to FIG. 25, a bag group forming process 350 will now be described which involves stacking a group of bags on the first pick table assembly 154 in the first bag group staging area GS1. The process 350 assumes that a designated number of bags equaling or exceeding the number of bags to be stacked in the bag group are accumulated on the accumulation conveyor 70 with the bags arranged end-to-end. The process 350 proceeds from START in block 352 to block 354, where a first layer of bags is formed on the shuttle 82 of pick table assembly 54. During this time, the shuttle 182 of the pick table assembly 54 is driven in a first direction (left or right) as successive bags are conveyed onto the shuttle 182 from the accelerator conveyor 82 to form the first layer. The backplate 202 remains fully-raised at this time to prevent bags from sliding off the back of the shuttle 182. The process 350 then proceeds to block 356, where it determines whether all layers are fully stacked, i.e., whether the group of bags is fully formed. If not, the process 350 proceeds to block 358, where the next layer of bags is formed. During this process, the discharge end of the accelerator conveyor 82 is raised, and the shuttle 182 is driven to move in the opposite direction (right or left) as successive bags are conveyed onto the shuttle 182 from the accelerator conveyor 82 to form another layer. The process 350 then returns to the inquiry block 356 and cycles between blocks 354 and 356 until all layers are formed. At that time, the process 350 proceeds to block 360 where the system 20 readies itself for a pick and place process by returning the shuttle 182 to its home or center position, by retracting and lowering the discharge end of the accelerator conveyor 82. The process 350 then returns to block 354 and initiates the next bag group forming sequence.

Figure 26:
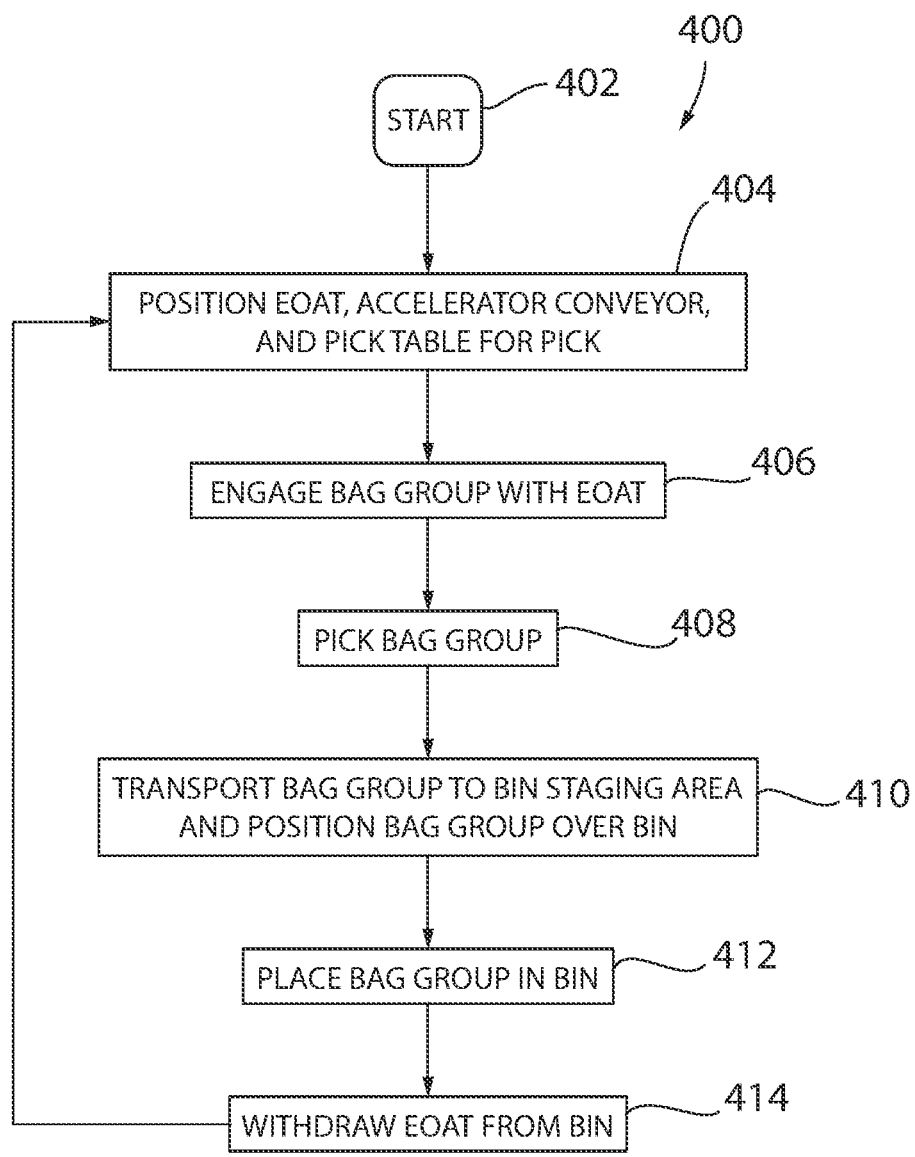
FIG. 26 is a flowchart of a bag group transport process of the bin packing process of FIG. 24.

Referring to FIG. 26, the pick and place process 400 will be described in connection with reference to a group of bags located in the first bag group staging area GS1, it being understood that the process 400 is identical with respect to bag groups formed in the second bag group staging area GS2. The process 400 proceeds from START in block 402 to block 404, where the EOAT 104 is positioned over the pick table 54 with the jaws 112 and 114 fully open. The group of stacked bags is fully formed on the pick table assembly 54 by the end of this positioning process, and the backplate 202 of shuttle 182 is in its mid-range position, having been lowered from its fully-raised position at the end of the bag group forming process. The accelerator conveyor 82 may be lowered and retracted at this time so as not to interfere with EOAT movement. The EOAT 104 then engages the bag group in block 406. In more detail, the EOAT 104 is lowered into a position in which the jaws 112 and 114 flank the front and rear ends of the bag group, and the backplate 202 also is lowered to its fully retracted position.

The process 400 then proceeds to block 408, where the EOAT 104 picks the group of bags in block 408 by closing the jaws 112, and 114 (rotating both rotary shaft 268 and rotary shaft 270) and lowering the hold down plates 116, 118 into engagement with the uppermost bags of the group. The EOAT 104 then transports the picked bag group to the bin and positions the bag group for placement in block 410. This positioning involves locating the bag group over a specified portion of the bin, and may include rotating the EOAT 104 90 degrees before lowering the bag group into the bin to achieve a bag group orientation that is desired for that particular location in the bin, both from the standpoint of footprint and from the standpoint of desired stacking pattern. The pattern in which the bags are stacked to form the bag group can be set to maximize stability and minimize wasted space. This pattern can even be varied from layer to layer as a bin is being packed to fill a bin with a desired number of bags.

The bag group is then placed in the bin in block 412 by lowering the bag group to a specified location within the bin. The EOAT 104 then is withdrawn from the bin in block 414 by opening the jaws 112 and 114 and raising the EOAT 104 out of the bin. Jaw opening may be performed incrementally, with the lower fingers 280 of jaws 112 and 114 first pivoting about rotary shaft 70 to release the bags while the EOAT 104 is raised. The jaws 112 and 114 are not rotated about the rotary shafts 268 until the EOAT is clear of the bin. This incremental opening minimizes the footprint of the EOAT 104 in the bin. The hold down plates 116 and 118 also are raised at this time. The process 400 then returns to block 404 and repeated.

Figure 27:
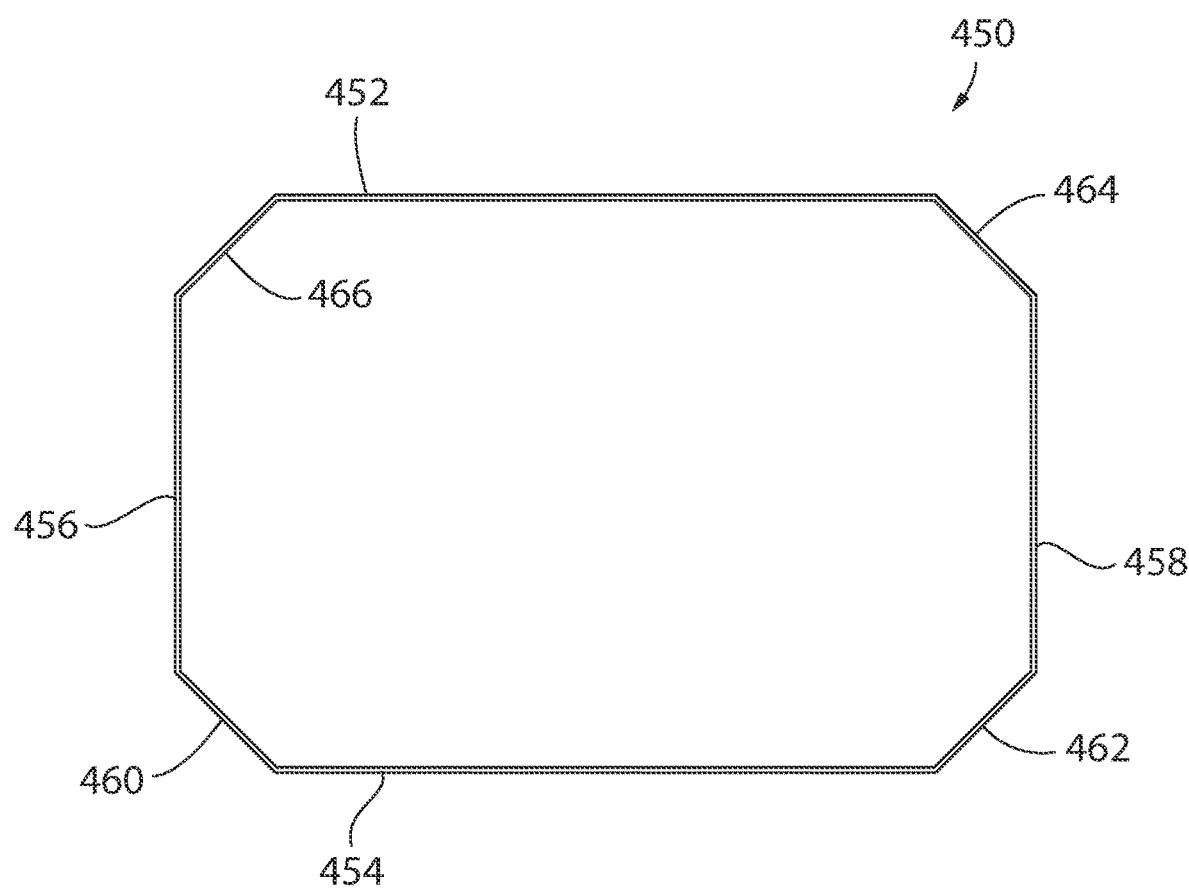
FIG. 27 is a schematic top plan view of a bin fillable using the system and process of the remaining views.
Figure 28:
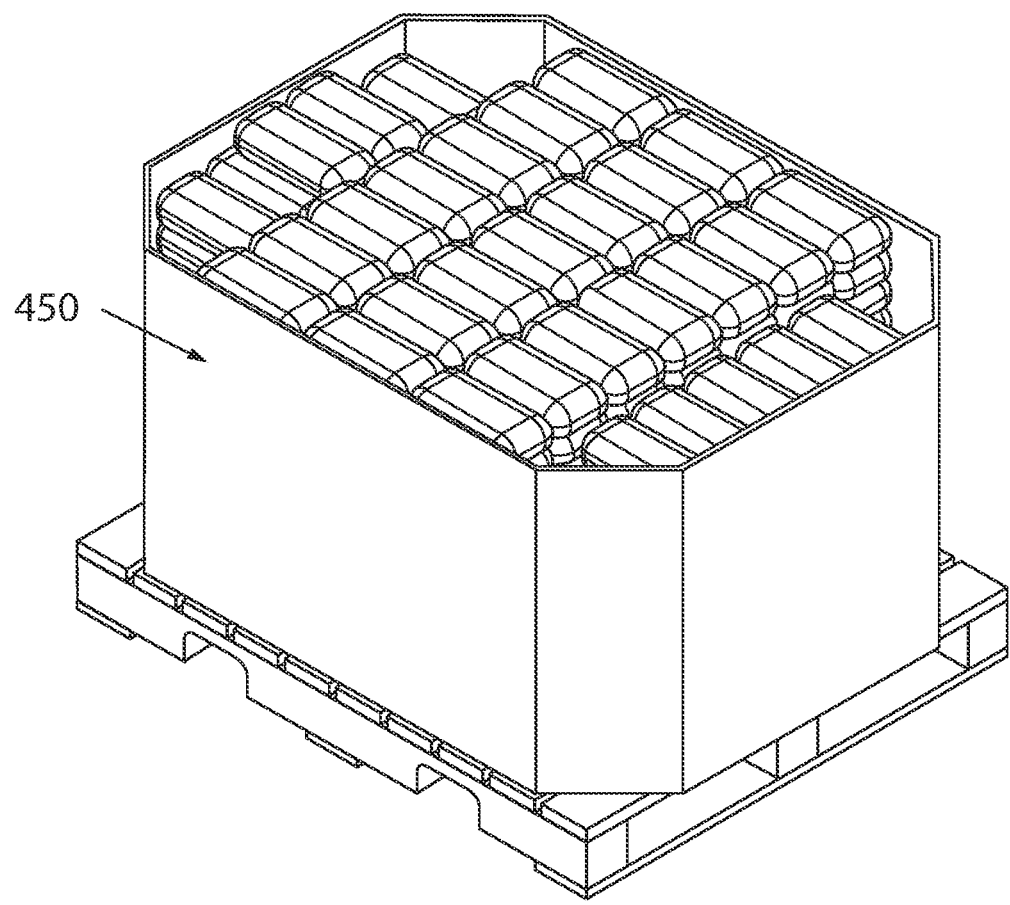
FIG. 28 is an isometric view of a bin filled with groups of bags placed therein in pre-designated pattern.
Figure 29:
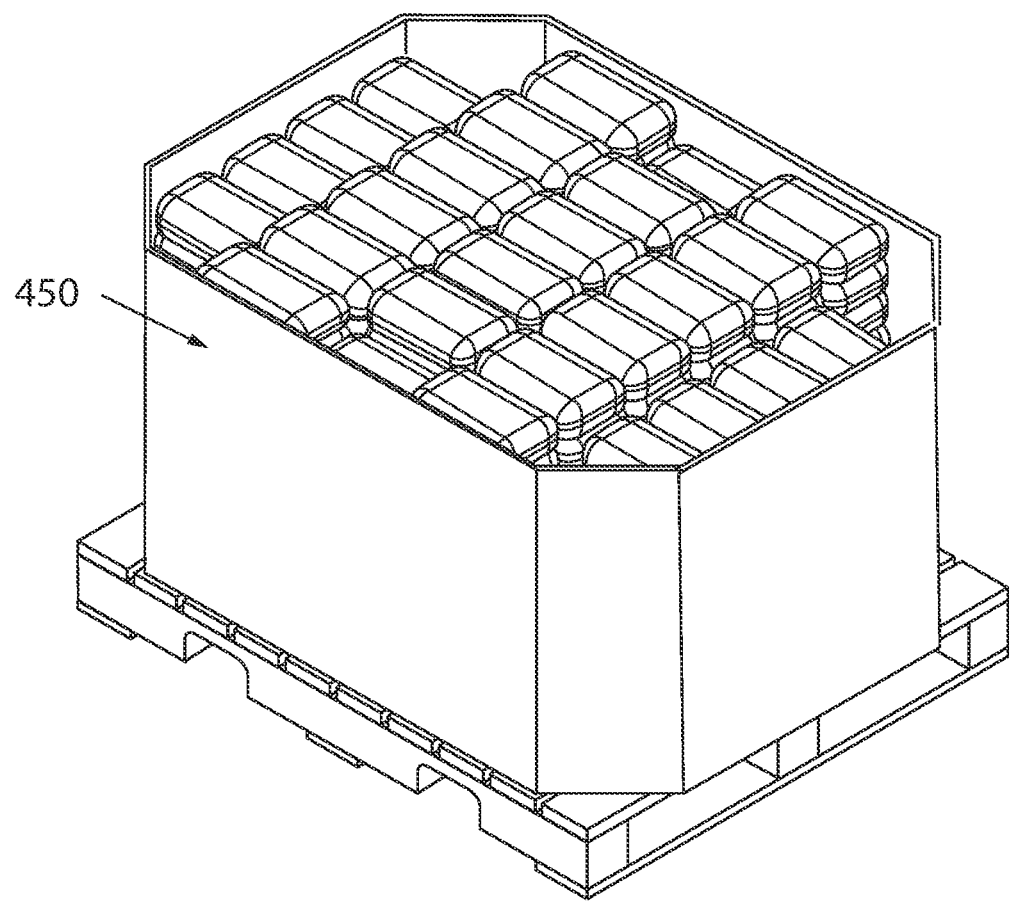
FIG. 29 is an isometric view of a bin filled with groups of bags placed therein in another pre-designated pattern.

As mentioned, the described system is capable of packing bins of a variety of capacities and a variety of shapes with a variety of bags. Typical bins have a mass capacity of 1000-2000 lbs. (450-900 kg), an area of 11 to 13 ft$^2$ (1.0 to 1.25 m$^2$), and an internal volume of (18 to 56 ft$^2$ (0.5 to 1.6 m$^3$). One such bin 450 are illustrated in FIG. 27. Bin 450 is generally octagonal in shape, or may be considered primarily rectangular with truncated or angled corners. Bin 450 has a capacity of 1000 lbs. (450 kg). It has four major walls including relatively long front and rear walls 452 and 454 and relatively short side walls 456 and 458. It's length between side walls is about 50" (1.27 m), and its width between end walls is about 38" (0.97 m). The major walls are joined by four relatively short inclined corner walls 460, 462, 464, and 466. The illustrated bin 450 typically will be packed with bags ranging in capacity from 3 lbs. (1.4 kg) to 20 lbs. (9 kg) to a height of 26" (0.66 m). Further, FIGS. 28 and 29 illustrate varying pre-designated patterns for bags to be placed in bin 450.

Experiments have shown that the system described above can fill or fully pack a bin 450 with relatively small (3-5 lbs. or 1.4 to 2.3 kg) at a rate of up to 100 bags/minute or even more. Medium sized, 8 lb. (3.7) kg can be paced at rate of up to 80 bags/minute or more, and large, 15-20 lb. (6.9-9 kg) bags can be packed at a rate of up to 40 bags/minute or more. The packing process continues without interruption, even during bin replacement operations.

It can thus be seen that the system 20 is very flexible. During a group forming process, each pick table assembly 54 or 56 provides freedom of motion along an x-axis by moving side to side. Pivoting and extension of each accelerator conveyor 82 provides freedom of motion in the y and z axes. The speeds of these assemblies can be individually controlled to vary stack sizes and patterns in each group. This flexibility not only permits the system 20 to accommodate a wide variety of bag shapes and sizes, but it also contributes to maximizing bin fill rates.

Many changes and modifications could be made to the invention without departing from the spirit thereof. The scope of some of these changes are discussed above. The scope of others will become apparent from the claims which follow.

We claim:

1. A bin packing system comprising:
   (A) first and second lanes, each of which has a conveyor system that transports individual bags;
   (B) first and second bag group staging areas, each of which is located downstream of a respective conveyor system in a direction of bag handling;
   (C) first and second bin staging areas, each of which is configured to stage bins for packing and has a conveyor system for subsequent transport out of the system;
   (D) a robot having an end of arm tool (EOAT), the EOAT being moveable laterally, longitudinally, and vertically to
      a. pick groups of bags from the first bag group staging area and the second bag group staging areas one group at a time; and
      b. alternatively pack first and second bins in the first and second bin staging area with picked groups.

2. The bin packing system as recited in claim 1, wherein each conveyor system comprises an accumulator conveyor that is configured to accumulate a designated number of bags with the bags arranged end to end, the accumulator conveyor comprising a controller and a plurality of individually-controlled zones that are arranged end-to-end, wherein the zones are controlled by the controller to convey each received bag into a downstream-most unoccupied zone and prevent conveyance of a bag out of that zone until the designated number of bags are positioned end-to-end and to thereafter convey bags off the accumulator conveyor.

3. The bin packing system as recited in claim 1, wherein each conveyor system further comprises at least one conveyor that is disposed downstream of the accumulator conveyor and that is controlled by the controller to operate at a higher speed than the accumulator conveyor.

4. The bin packing system as recited in claim 1, wherein each conveyor assembly comprises an accelerator conveyor that has an inlet end and a discharge end that can be raised and lowered under power of a powered actuator to stack bags in the associated bag group staging area.

5. The bin packing system as recited in claim 4, wherein the discharge end of the accelerator conveyor can be driven toward and away from the inlet end by a powered actuator.

6. The bin packing system as recited in claim 4, further comprising a pick table assembly located in each bag group staging area, wherein each pick table assembly comprises a frame and a shuttle that is located under the discharge end of the associated accelerator conveyor and that is moveable laterally relative to the accelerator conveyor so that successive bags discharged from the accelerator conveyor and deposited on the shuttle are spaced laterally of one another.

7. The bin packing system as recited in claim 6, wherein the shuttle of each pick table assembly includes a base forming a bag support surface, a backplate extending upwardly from a rear of the base, and end plates extending upwardly from opposed ends of the base.

8. The bin packing system as recited in claim 7, wherein the backplate is raiseable and lowerable relative to the base via actuation of at least one powered actuator operatively coupled to the backplate.

9. The bin packing system as recited in claim 8, wherein the backplate is configured to be movable between and selectively retained in a fully raised position, a fully-lowered position, and a mid-range position located vertically between the fully-raised position and the fully-lowered position.

10. The bin packing system as recited in claim 1, wherein the EOAT comprises
a support frame,
first and second laterally-spaced, longitudinally-extending jaws extending downwardly from the support frame, each of the jaws being pivotable about a respective longitudinal axis, and
at least one hold down plate located between the jaws and movable vertically relative to the support frame.

11. The bin packing system as recited in claim 10, wherein each of the jaws includes a first, upper end that is pivotally mounted on the support frame, a second, lower end, and an intermediate pivot connection via which the second end can be driven to pivot relative to the first end under power of a powered actuator.

12. The bin packing system as recited in claim 10, wherein each of the jaws comprises a plurality of longitudinally-spaced finger assemblies.

13. A system for staging a group of bags prior to packing the bags in a bin, the system including:
a conveyor having an inlet end and a discharge end; and
a pick table assembly comprising a frame and a shuttle that is located under the discharge end of the conveyor and that is moveable laterally relative to the conveyor so that successive bags discharged from the conveyor and deposited on the shuttle are spaced laterally of one another;
wherein the shuttle includes a base forming a bag support surface, a backplate extending upwardly from a rear of the base, and end plates extending upwardly from opposed ends of the base;
wherein the backplate is raisable and lowerable relative to the base via actuation of a powered actuator operatively coupled to the backplate.

14. The system as recited in claim 13, wherein the backplate is configured to be movable between and selectively retained in a fully-raised position, a fully-lowered position, and a mid-range position located vertically between the fully-raised position and the fully-lowered position.

15. The system as recited in claim 13, wherein the base includes a plurality of longitudinally extending, laterally-spaced rods.

16. The system as recited in claim 15, wherein some rods are positioned at different heights relative to other rods to promote stability of stacked bags thereon by inhibiting the bags from sliding side-to-side.

17. The system as recited in claim 13, wherein the conveyor has an inlet end and a discharge end that can be raised and lowered under power of a powered actuator relative to the inlet end to stack layers of bags on the pick table assembly.

18. The system as recited in claim 17, wherein the powered actuator is configured to drive the conveyor to pivot about a horizontal pivot axis.

19. The system as recited in claim 17, wherein the discharge end of the accelerator conveyor can be driven toward and away from the inlet end by a powered actuator.

20. A method of packing bins, comprising:
(A) forming a first group of bags by stacking bags in a first bag group staging area of first and second spaced bag group staging areas; then
(B) using a robotic end of arm tool (EOAT), packing the first group of bags in a bin by picking the first group of bags from the first bag group staging area and placing the first group of bags in the bin, the bin being in a first bin staging area of first and second spaced bin staging areas, each with a respective infeed conveyor;
(C) during forming of the first group of bags, using the EOAT, packing a second group of bags in the bin by picking a second group of bags from the second bag group staging area and placing the second group of bags in the bin;
(D) during the packing of the first group of bags in the bin, forming a third group of bags by stacking bags in the second bag group staging area; and
(E) repeating steps (A) through (D) until the first bin is fully packed.

21. The method of claim 20 further comprising, while the bin is being packed, conveying a second, full bin out of the second bin staging area and replacing the second bin with a third, empty bin.

22. The method as recited in claim 21, further comprising packing the third bin by:
(A) forming a third group of bags by stacking bags in the first bag group staging area; then
(B) using the (EOAT), packing the third group of bags in the third bin by picking the third group of bags from the first bag group staging area and placing the first group of bags in the third bin;
(C) during forming of the third group of bags, using the EOAT, packing a fourth group of bags in the third bin by picking the fourth group of bags from the second bag group staging area and placing the fourth group of bags in the third bin;
(D) during the packing of the third group of bags in the third bin, forming a fifth group of bags by stacking bags in the second bag group staging area; and
(E) repeating steps (A) through (D) until the third bin is fully packed.

23. The method as recited in claim 22, wherein the method comprises packing both the first and third bins with five-pound capacity bags, from the initiation of the packing of the first bin to the completion of packing of the third bin, at an average rate of at least 50 bags per minute.

24. The method as recited in claim 22, wherein the method comprises packing both the first and third bins with five-pound capacity bags, from the initiation of the packing of the first bin to the completion of packing of the third bin, at an average rate of at least 70 bags per minute.

25. The method as recited in claim 20, wherein the group of bags includes at least two stacked bags.

26. The method as recited in claim 25, wherein the group of bags includes at least 5 bags stacked in at least two layers.

27. The method as recited in claim 20, wherein the forming comprises discharging successive bags from a discharge end of a conveyor onto a shuttle that is reciprocating back and forth beneath the discharge end of the conveyor.

28. The method as recited in claim 20, wherein the packing comprises placing groups of bags in the bins in pre-designated patterns.

29. The method as recited in claim 28, wherein the packing step comprises stacking groups of bags in layers having different, pre-designated patterns in successive layers.

30. The method as recited in claim 20, wherein each bin has a mass capacity of 450-900 kgs, an area of 1.0 to 1.25 m$^2$, and an internal volume of 0.5 to 1.6 m$^3$.

31. The method as recited in claim 20, wherein each bin is octagonal when viewed in top plan.

* * * * *